United States Patent
Okamoto et al.

(10) Patent No.: US 7,239,090 B2
(45) Date of Patent: Jul. 3, 2007

(54) DISCHARGE LAMP LIGHTING APPARATUS

(75) Inventors: Masashi Okamoto, Hyogo (JP); Izumi Takaya, Hyogo (JP); Takumi Hashimoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/546,283

(22) Filed: Oct. 12, 2006

(65) Prior Publication Data

US 2007/0085486 A1    Apr. 19, 2007

(30) Foreign Application Priority Data

Oct. 13, 2005    (JP)    ............... 2005-298920

(51) Int. Cl.
*H05B 37/02* (2006.01)
(52) U.S. Cl. .................. 315/219; 315/224; 315/276
(58) Field of Classification Search ........... 315/219, 315/224, 276, DIG. 5
See application file for complete search history.

(56) References Cited

U.S. PATENT DOCUMENTS 6,570,343 B1 * 5/2003 Shoji et al. ............ 315/224
6,630,797 B2 * 10/2003 Qian et al. ............ 315/224

FOREIGN PATENT DOCUMENTS

| JP | 03-030291 A | 2/1991 |
| JP | 2003-217888 A | 7/2003 |
| JP | 2004-327117 A | 11/2004 |

* cited by examiner

*Primary Examiner*—David Vu
(74) *Attorney, Agent, or Firm*—Rader, Fishman & Grauer PLLC

(57) ABSTRACT

A resonant transformer is disposed at a stage following an inverter for inverting the polarity of a voltage applied to a discharge lamp. A parallel resonant circuit is formed by a resonant capacitor and a primary winding of the resonant transformer, and a periodic voltage applying section is connected to the parallel resonant circuit. The periodic voltage applying section is operated at a frequency that causes resonance in the parallel resonant circuit, thereby applying a high AC voltage to the discharge lamp in a period in which discharge is started in the discharge lamp.

14 Claims, 8 Drawing Sheets

PRIOR ART

DISCHARGE LAMP LIGHTING APPARATUS

This application claims priority from Japanese Patent Application Serial No. 2005-298920 filed Oct. 13, 2005, the content of which is incorporated herein by reference in its entirety

TECHNICAL FIELD

The present invention relates to a discharge lamp lighting apparatus for lighting a discharge lamp, and more particularly to a discharge lamp lighting apparatus for lighting a high intensity discharge lamp such as a high-pressure mercury lamp, a metal halide lamp, or a xenon lamp.

BACKGROUND

A high intensity discharge lamp (HID) is used, for example, in a light source apparatus for use in an optical apparatus for displaying an image such as a liquid crystal projector or a DLP (trademark) projector.

In such a projector, a given original image is separated into three primary color components of R, G, and B by using a dichroic prism or the like, and respective three primary color images are generated by using spatial modulation devices provided for the respective three primary colors. The resultant image paths of respective three primary colors are combined by using a dichroic prism or the like again so that a single full color image may be displayed.

On the other hand, there is a projector, in which light emitted from a light source is passed through a combined three primary colors R, G, and B filter which is rotating, thereby sequentially generating light rays of three primary colors R, G, and B. In synchronization with the generation of the light rays, a spatial modulation device is controlled so as to sequentially generate respective three primary colors thereby displaying a color image.

To start such a lamp while a voltage called a no-load open-circuit voltage is applied to the lamp, a high voltage is applied thereto to cause an electrical breakdown in a discharge space, and discharge first occurs in a glow discharge mode and is then shifted to an arc discharge mode.

As a method of applying the high voltage to the lamp, there is an external triggering method in which an auxiliary electrode is provided in addition to the main discharge electrodes such that the auxiliary electrode is not in contact with a discharge space, and a high voltage is applied to the auxiliary electrode, in addition to a serial triggering method in which the high voltage is superimposed to main discharge electrodes by using an igniter.

The external triggering method has various advantages over the serial triggering method. In particular, where a high voltage generator including a high voltage transformer is separated from a power supply circuit and is disposed close to a discharge lamp, the external triggering method is particularly advantageous such as a reduction in size/weight of the discharge lamp lighting apparatus, a reduction in noise, an improvement in safety, and a reduction in cost.

As driving methods of a discharge lamp in a steady lighting state, there are a DC driving method and an AC driving method. The DC driving method has a great advantage that this method can be applied to both types of projectors since the intensity of light emitted from the lamp does not change according to time. On the other hand, the AC driving method has an advantage over the DC driving method in that there is a possibility that ablation or growth of electrodes of the discharge lamp can be controlled by using a polarity inverting frequency which does not exist in the DC driving method, although the AC driving method also has disadvantages attributing to the polarity inversion.

In general, there is a short break, an overshoot, or an oscillation of light flux emitted from the lamp each time the polarity is inverted to generate the AC voltage by which the lamp is driven. Therefore, if the AC driving method is applied to the above-described type of projector that sequentially generates color image frames in a time dividing manner, the displayed image fluctuates at a beat frequency corresponding to a difference between the timing of generating color image frames and the timing of inverting the polarity to generate the AC voltage by which the lamp is driven. Depending on the beat frequency, the fluctuation deteriorates the quality of the displayed image. Although to prevent the above problem, the polarity of the inverter is usually inverted in synchronization with the rotation of the color filter, the discharge lamp lighting apparatus becomes complicated therefore.

In the case of the DLP-type projector, since the luminance of each color of each pixel of a displayed image is controlled by the duty cycle of an operation of each pixel of the spatial modulation device, when this type of projector is driven by the AC driving method, if the overshoot or the oscillation of the light flux continues for a long period each time the polarity is inverted, it is desirable not only to control the synchronization of timing in the above-described manner but also to control the operation such that the light flux is not used during this period or such that the fluctuation is cancelled out by controlling the operation of each pixel of the spatial modulation device. However, if the light flux is not used during the above-described period, the efficiency of using the light flux is reduced. On the other hand, in the case where the operation of each pixel of the spatial modulation device of the projector is controlled in the above-described manner, very complicated control is necessary.

The disadvantages of the AC driving of the discharge lamp can be overcome by reducing the fluctuation of the light that occurs at polarity transitions. However, this is not easy to achieve, because, in the discharge lamp lighting apparatus, in addition to the reduction in the fluctuation of the light that occurs when the polarity of the voltage applied to the lamp is inverted, high reliability in certainly starting discharge of the discharge lamp is demanded.

It is known that when an electrical breakdown is created in the discharge space by applying the high voltage in the serial triggering method or the external triggering method, in order to achieve high reliability in starting of discharge in the discharge lamp, it is effective to use a high no-load open-circuit voltage applied to the lamp. In the case of the AC driving method, it is effective to increase the no-load open-circuit voltage applied to the lamp. In the AC driving method, in order to achieve the high reliability, a resonance assist is carried out, in which while a high voltage is increased by generating a series resonance to the lamp, an igniter is operated to create an electrical breakdown in the discharge space.

In FIG. 14, the principle of the resonance assist technique using the series resonance is described below.

In this example shown in FIG. 14, a discharge lamp lighting apparatus includes a power supply circuit (Ux') for supplying electrical power to a discharge lamp (Ld), a full-bridge inverter (Ui') comprising switch elements (Q1', Q2', Q3', and Q4') for inverting the polarity of the output voltage of the power supply circuit (Ux'), a resonant coil (Lr), a resonant capacitor (Cr), and a starter circuit (Ut"). In a starting operation, the inverter (Ui') is operated so as to invert the polarity of the output voltage of the power supply circuit (Ux') at a frequency equal to or close to the resonant frequency determined by the product of the inductance of the resonant coil (Lr) and the capacitance of the resonant capacitor (Cr), so that LC series resonance occurs and a high voltage is generated between two terminals of the resonant capacitor (Cr). This high voltage is applied to the discharge lamp (Ld) and the starter circuit (Ut"), connected in parallel to the resonant capacitor (Cr).

However, in such a discharge lamp lighting apparatus using the LC series resonance, although high reliability can be achieved in the lamp starting operation, it is difficult to reduce the fluctuation of the intensity of the light flux that occurs when the polarity of the voltage applied to the lamp is inverted, because of the reasons described below.

As described above, since the LC resonant frequency is determined by the product of the inductance of the resonant coil (Lr) and the capacitance of the resonant capacitor (Cr), when it is desirable to reduce the inductance of the resonant coil (Lr), it is necessary to increase the capacitance of the resonant capacitor (Cr). If both the inductance of the resonant coil (Lr) and the capacitance of the resonant capacitor (Cr) are reduced, the resonant frequency becomes too high to properly operate the inverter (Ui'). However, in order to obtain a sufficiently high enough voltage by resonance using the resonant capacitor (Cr) having capacitance set to a large value, it is required to pass a very large current through the series connection of the resonant coil (Lr) and the resonant capacitor (Cr). That is, the increase in the capacitance of the resonant capacitor (Cr) creates a problem that the resonance current becomes very large.

For example, when the switch element (Q1') and the switch element (Q3') are in an on-state, the resonance current flows across the whole circuit including the power supply circuit (Ux') and the inverter (Ui') along a path (L01) shown within a broken line of FIG. 14. Therefore, each circuit element must be designed to allow the large resonance current to pass therethrough. However, this causes an increase in the apparatus size and an increase in cost.

When the operation is performed in a high-order resonance mode although the resonant frequency is set to be very high, the inverter (Ui') is allowed to operate at a low frequency, and the resonant capacitor (Cr) is allowed to have low capacitance. However, even in this case, the resonance current also flows through the path (L01) shown in the broken of FIG. 14, and a relatively large on-resistance of each switch element causes the resonant circuit to have a small Q value, thereby resulting in large attenuation of resonance. This makes it difficult to use the high-order resonance mode.

As described above, as long as the LC series resonance is used, it is difficult to reduce the inductance of the resonant coil (Lr), that is, it is necessary to set the inductance of the resonant coil (Lr) to a high value. On the other hand, in an operation phase in which light emitted from the lamp is used in a steady lighting state after the lamp is started, the large inductance of the resonant coil (Lr) causes a great disadvantage in the operation. More specifically, the large inductance of the resonant coil (Lr) causes an increase in an undesirable phenomenon such as an overshoot or a vibration of the light flux at polarity transitions, and thus there is still the unsolved problem that the light flux fluctuates when the polarity of the voltage applied to the lamp is inverted. See Japanese Laid Open Patent Nos. H03-030291, 2003-217888, and 2004-327117.

SUMMARY

It is an object of the present invention to provide a discharge lamp lighting apparatus having a discharge lamp turned on by an AC voltage in which while a fluctuation of the intensity of a light flux is suppressed when the polarity of the voltage applied to the discharge lamp is inverted, the discharge lamp is turned on in a highly reliable manner at starting.

The present invention provides, as claimed in Claim 1, a discharge lamp lighting apparatus for lighting a discharge lamp (Ld) including a pair of main-discharge electrodes (E1 and E2) disposed so as to oppose each other, the discharge lamp lighting apparatus comprising a power supply circuit (Ux) for supplying electrical power to the discharge lamp (Ld), an inverter Ui disposed at a stage following the power supply circuit (Ux) and serving to invert the polarity of a voltage applied to the discharge lamp (Ld), a resonant transformer (Th) having a primary winding (Ph) and a secondary winding (Sh), a resonant capacitor (Ch), and periodic voltage applying means (Uj), the secondary winding (Sh) of the resonant transformer (Th) being disposed in a path between an output of the inverter (Ui) and the main-discharge electrodes of the discharge lamp (Ld), the resonant capacitor (Ch) being connected in parallel to the primary winding (Ph) of the resonant transformer (Th) so as to form a parallel resonant circuit (Nh), the periodic voltage applying means (Uj) being connected to the parallel resonant circuit (Nh), the periodic voltage applying means (Uj) being operated in a starting period of the discharge lamp (Ld) at a frequency that can cause resonance to occur in the parallel resonant circuit (Nh).

The present invention provides, as claimed in Claim 2 according to Claim 1, a discharge lamp lighting apparatus wherein the periodic voltage applying means (Uj) includes a resonance driving power source (Mh), resonance driving current limiting means (Zh), and a resonance driving switch element (Kh), which are connected in series, and wherein the periodic voltage applying means (Uj) applies a voltage to the parallel resonant circuit (Nh) when the resonance driving switch element (Kh) is in an on-state.

The present invention provides, as claimed in Claim 3 according to Claim 1, a discharge lamp lighting apparatus wherein the periodic voltage applying means (Uj) includes a resonance driving power source (Mh), resonance driving current limiting means (Zh), a resonance driving transformer (Td) having a primary winding (Pd) and a secondary winding (Sd), and a transformer driving switch element (Kd), and wherein the resonance driving power source (Mh), the primary winding (Pd), and the transformer driving switch element (Kd) are connected to each other, and a voltage is applied to the parallel resonant circuit (Nh) via the secondary winding (Sd) by periodic operation of the transformer driving switch element (Kd).

The present invention provides, as claimed in Claim 4 according to Claim 2 or 3, a discharge lamp lighting apparatus wherein the resonance driving current limiting means (Zh) includes an inductive element, and a regenerative diode (Dz) is connected in a particular direction to the resonance driving current limiting means (Zh) so that magnetic energy corresponding to a current flowing through the inductive element during a period in which no current is supplied from the resonance driving current limiting means (Zh) to the parallel resonant circuit (Nh) is regeneratively returned to the resonance driving power source (Mh) through the regenerative diode (Dz).

The present invention provides, as claimed in Claim 5 according to Claim 2 or 3, a discharge lamp lighting apparatus wherein the resonance driving current limiting means (Zh) is a primary winding (Pz) of a current limiting/returning transformer (Tz) having a secondary winding (Sz) in addition to the primary winding (Pz), and a regenerative diode (Dsz) is connected, in series and in a particular direction, to the secondary winding (Sz) so that magnetic energy corresponding to a current flowing through the primary winding (Pz) during a period in which no current is supplied from the primary winding (Pz) to the parallel resonant circuit (Nh) is regeneratively returned to the resonance driving power source (Mh) through the regenerative diode (Dsz).

The present invention provides, as claimed in Claim 6 according to Claim 1, a discharge lamp lighting apparatus wherein the periodic voltage applying means (Uj) includes a resonance driving power source (Mh), a resonance driving energy supplying transformer (Ty) having a primary winding (Py) and a secondary winding (Sy), a transformer driving switch element (Ky), and a regenerative diode (Dsy), the resonance driving power source (Mh), the primary winding (Py), and the transformer driving switch element (Ky) are connected in series, and the resonance driving power source (Mh), the parallel resonant circuit (Nh), the secondary winding (Sy), and the regenerative diode (Dsy) are connected in series, whereby when the transformer driving switch element (Ky) is in an on-state, magnetic energy is stored in the resonance driving energy supplying transformer (Ty), while when the transformer driving switch element (Ky) is in an off-state, the magnetic energy stored in the resonance driving energy supplying transformer (Ty) is regeneratively returned to the resonance driving power source (Mh) via the regenerative diode (Dsy) and a voltage is applied to the parallel resonant circuit (Nh).

The present invention provides, as claimed in Claim 7 according to one of Claims 4 to 6, a discharge lamp lighting apparatus wherein the resonance driving power source (Mh) includes a current supply diode (Dm) connected to a DC power source (Mv) so as to receive a current from the DC power source (Mv), and a smoothing capacitor (Cm), and wherein a charged voltage of the smoothing capacitor (Cm) is boosted up by energy regeneratively returned from the periodic voltage applying means (Uj).

The present invention provides, as claimed in Claim 8 according to one of Claims 1 to 7, a discharge lamp lighting apparatus wherein an amplitude clamp preventing diode (Dk) is connected between the parallel resonant circuit (Nh) and the periodic voltage applying means (Uj) in a direction that allows a current to flow through the amplitude clamp preventing diode (Dk) only in a period in which a voltage waveform of the parallel resonant circuit (Nh) has voltage values that are not greater than the voltage applying capacity of the periodic voltage applying means (Uj).

The present invention provides, as claimed in Claim 9 according to Claim 3, a discharge lamp lighting apparatus wherein the inverter (Ui) includes a switch element that also functions as the transformer driving switch element.

The present invention provides, as claimed in Claim 10 according to one of Claims 1 to 9, a discharge lamp lighting apparatus wherein the resonant frequency of the parallel resonant circuit (Nh) is equal to a second or higher-order harmonic frequency of the operating frequency of the periodic voltage applying means (Uj).

The present invention provides, as claimed in Claim 11 according to one of Claims 1 to 10, a discharge lamp lighting apparatus wherein the total inductance of inductive components present in a path of a main-discharge current of the discharge lamp (Ld) in a section following the inverter (Ui) is equal to or lower than 170 µH.

The present invention provides, as claimed in Claim 12 according to one of Claims 1 to 11, a discharge lamp lighting apparatus wherein the discharge lamp (Ld) includes an auxiliary electrode (Et) disposed so as not to be in contact with the discharge space, in addition to the main-discharge electrodes (E1 and E2), the discharge lamp lighting apparatus further includes a starter circuit (Ut) for applying a high voltage to the auxiliary electrode (Et), and the main-discharge current flowing between the electrodes (E1 and E2) does not substantially flow through the starter circuit (Ut).

The present invention provides, as claimed in Claim 13 according to one of Claims 1 to 12, a discharge lamp lighting apparatus further comprising tuning degree detection means for detecting an operating status of the parallel resonant circuit (Nh) and generating a tuning degree signal corresponding to the difference between the operating frequency of the periodic voltage applying means (Uj) and the resonant frequency of the parallel resonant circuit (Nh), and operating frequency data maintaining/changing means for initializing or maintaining operating frequency data specifying the operating frequency of the periodic voltage applying means (Uj) and for increasing or decreasing the operating frequency data in accordance with the tuning degree signal, wherein the operating frequency data maintaining/changing means operates such that the operating frequency data maintaining/changing means initializes the operating frequency data at the beginning of a starting sequence of the discharge lamp lighting apparatus, increases or decreases the operating frequency data in a period in which no discharge occurs in the discharge lamp (Ld), and maintains the operating frequency data in a period in which discharge occurs in the discharge lamp (Ld).

The present invention provides, as claimed in Claim 14 according to Claim 1 or 13, a discharge lamp lighting apparatus wherein the tuning degree detection means generates the tuning degree signal on the basis of a value corresponding to the amplitude of the voltage of the parallel resonant circuit (Nh).

The present discharge lamp lighting apparatus has the advantage that a discharge lamp is lighted by applying an AC voltage thereto in which while a fluctuation of the intensity of a light flux is suppressed when the polarity of the voltage applied to the discharge lamp is inverted, discharge of the discharge lamp is started in a highly reliable manner when the discharge lamp is turned on.

BRIEF DESCRIPTION OF THE DRAWINGS

Other features and advantages of the present discharge lamp lighting apparatus will be apparent from the ensuing description, taken in conjunction with the accompanying drawings, in which.

DETAILED DESCRIPTION

Figure 1:
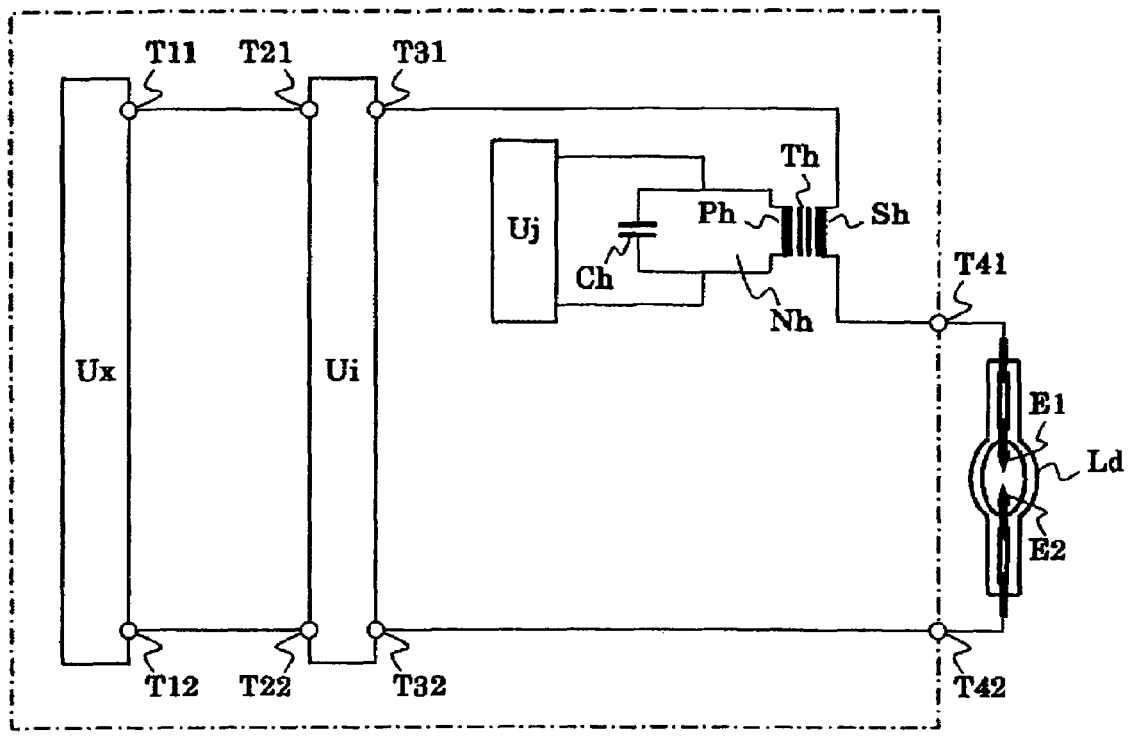
FIG. 1 is a simplified block diagram showing a discharge lamp lighting apparatus.

While the claims are not limited to the illustrated embodiments, an appreciation of various aspects of the discharge lamp lighting apparatus is best gained through a discussion of various examples thereof.

First, referring to a simplified block diagram shown in FIG. 1, a discharge lamp lighting apparatus according to an embodiment is described below.

A power supply circuit (Ux) comprising, for example, a switching circuit such as a step-down chopper or a step-up chopper outputs a voltage/current according to the state of the discharge lamp (Ld) or a lamp starting sequence. An inverter (Ui) comprising, for example, a full bridge circuit generates an AC voltage by for example periodically inverting the voltage output from the power supply circuit (Ux). The generated AC voltage is applied to a pair of primary discharge electrodes (E1 and E2) of the discharge lamp (Ld) via a secondary winding (Sh) of a resonant transformer (Th).

When lighting of the lamp is started, the voltage output as the no-load open-circuit voltage from the power supply circuit (Ux) is typically in the range of 200 to 300 V. When the lamp is in a glow discharge mode, the lamp voltage is typically 100 to 200 V. In a state immediately after the discharge is brought into an arc discharge mode, the lamp voltage is about 10 V. The power supply circuit (Ux) is controlled such that the flowing current does not exceed a predetermined limit in the glow discharge mode or the arc discharge mode.

A resonant capacitor (Ch) is connected in parallel to a primary winding (Ph) of the resonant transformer (Th) such that the resonant capacitor (Ch) and the primary winding (Ph) form the parallel resonant circuit (Nh). The resonant frequency of this parallel resonant circuit (Nh) is calculated mainly on the basis of the product of the capacitance of the resonant capacitor (Ch) and the inductance of the primary winding (Ph). When the secondary winding (Sh) has a capacitive component such as stray capacitance, the resonant frequency is calculated taking into account an effect of the capacitive component.

When lighting of the lamp is started, a periodically varying voltage is applied from periodic voltage applying section (Uj) to the parallel resonant circuit (Nh). When the frequency of the voltage of the voltage of periodic voltage applying unit (Uj) and the resonant frequency are in the relationship of the fundamental resonance or a harmonic resonance or relationship close to it, a resonant current flows through the parallel resonant circuit (Nh) and a high voltage is generated in the primary winding (Ph). This voltage generated in the primary winding (Ph) induces a voltage depending on the turn ratio of the secondary winding (Sh).

For example, when the voltage of a node (T31) with respect to the voltage of a node (T32) is 200 V and the peak-to-peak value of the AC voltage generated in the secondary winding (Sh) is ±800 V, as high a voltage as −600 to 1000 V is applied between a node (T42) and a node (T41), that is, between the electrodes (E1 and E2) for generating the main discharge in the discharge lamp (Ld). Thus, in this state, if high voltage applying means of a serial triggering type or an external triggering type is used in addition to the elements shown in FIG. 1, it is possible to resolve the above-described problem that it is difficult to start discharge in the discharge lamp in a highly reliable fashion when the discharge lamp is turned on.

Figure 14:
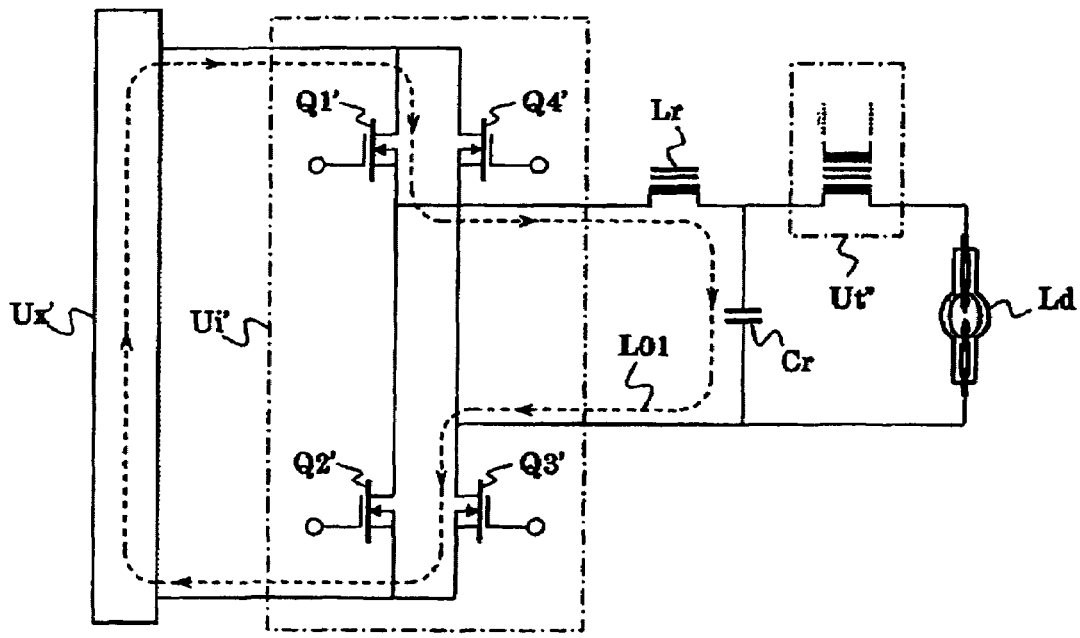
FIG. 14 is a schematic diagram showing a discharge lamp lighting apparatus according to a known technique.

The present parallel resonant circuit (Nh) has a very small resonant circuit path compared with the path (L01) of the series resonant circuit described above with reference to FIG. 14. That is, the resonant circuit path includes only the resonant capacitor (Ch) and the primary winding (Ph) and does not include any other element such as a switching element. Thus, in the present parallel resonant circuit (Nh), unlike the series resonant circuit in which great attenuation does not allow harmonic resonance, the resonant circuit path has a very small loss, and thus harmonic resonance can be easily achieved.

The frequency of the periodic voltage applying section (Uj) can be low even though a high resonant frequency is high, so that it is possible to reduce both the capacitance of the resonant capacitor (Ch) and the inductance of the primary winding (Ph). The reduction in the capacitance of the resonant capacitor (Ch) results in a reduction in the resonant current, so that it is possible to reduce the size, the loss, and the cost of circuit elements.

Furthermore, in the present embodiment, because the inductance of the primary winding (Ph) can be reduced, it is also possible to reduce the inductance of the secondary winding (Sh). The above described series resonant circuit of to FIG. 14 has the problem that the large inductance of the resonant coil causes an undesirable phenomenon such as an overshoot or oscillation of a light flux to occur when the polarity is inverted. In contrast, in the present embodiment, by reducing the inductance of the secondary winding (Sh), it is possible to suppress the undesirable phenomenon such as an overshoot or oscillation of a light flux when the polarity is inverted. As a result, it is also possible to solve the problems described above, that is, it is possible to reduce the change in the light flux that occurs when the polarity of the voltage applied to the lamp is inverted.

To experimentally determine the upper allowable limit of the inductance of the secondary winding (Sh), at which the discharge lamp lighting apparatus is practically used to light the lamp of the DLP-type projector, a 135 W discharge lamp (Ld) and the discharge lamp lighting apparatus were actually installed in the projector, and the quality of the displayed image was evaluated. In the evaluation, the discharge lamp lighting apparatus was operated without synchronizing the timing of inverting the polarity of the inverter with respect to the rotation of a color filter, and the evaluation was made for various inductance values of the coil inserted in the section following the inverter in the discharge lamp lighting apparatus. The result of the experiment showed that in the case of a DLP projector of a front projection type for use in presentation, there is practically no problems in case of the inserted inductance up to 80 μH. The experiment also showed that when the polarity was inverted by the inverter in synchronization with the rotation of the color filter, there is practically no problem in case of greater inserted inductance values of up to 170 μH.

However, in case of a DLP projector for use in a rear projection television set, since high halftone image quality is required, it is desirable to synchronize the timing of inversion of the polarity of the inverter with the rotation of the color filter or to set the inserted inductance to be equal or lower than the 55 μH. In this type of projector, if the timing of inversion of the polarity of the inverter is synchronized with the rotation of the color filter, the inserted inductance may be set to a greater value up to 120 μH or greater.

As increasing the ratio of the number of turns of the secondary winding (Sh) to the number of turns of the primary winding (Ph) increases, the step-up ratio (ability) of the transformer increases, so that it is advantageous that a higher voltage is induced in the secondary winding (Sh). However, since as the turn ratio increases, the inductance of the secondary winding (Sh) increases, in designing, it is necessary to take into consideration the balance of the step-up ratio of the resonant transformer (Th) and the inductance of the secondary winding (Sh).

Figure 2:
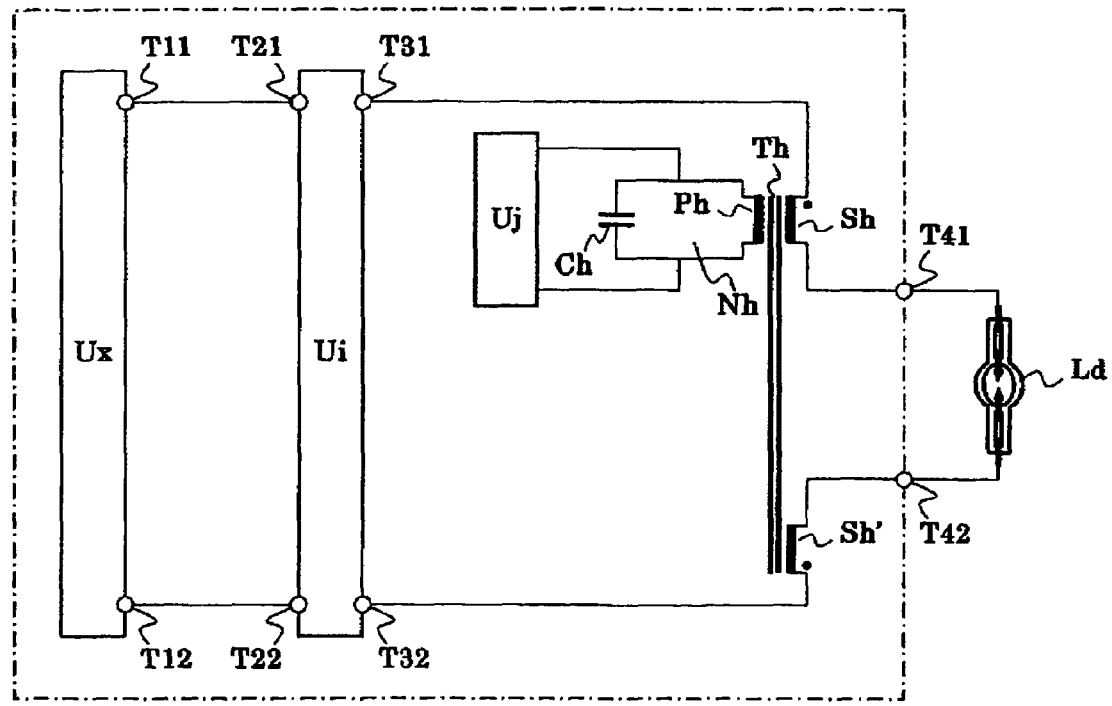
FIG. 2 is a schematic block diagram showing a discharge lamp lighting apparatus.

In addition, the discharge lamp lighting apparatus according to the present invention is not limited to the above-described embodiment in which the resonant transformer (Th) has only one secondary winding, but the resonant transformer (Th) may have an additional secondary winding (Sh') in addition to the secondary winding (Sh), in which the secondary winding (Sh) is connected to the electrode (E1) of the discharge lamp (Ld) and the secondary winding (Sh') is connected to the other electrode (E2) of the discharge lamp (Ld) as shown in the form of a schematic block diagram in FIG. 2, in which the phase of the voltage waveform applied to the electrode (E1) from the secondary winding (Sh) is opposite to the phase of the voltage waveform applied to the other electrode (E2) from the secondary winding (Sh').

In the configurations described above, if the number of turns of the primary winding (Ph) of the resonant transformer (Th) of the discharge lamp lighting apparatus shown in FIG. 1 is equal to the number of turns of primary winding (Ph) of the resonant transformer (Th) of the discharge lamp lighting apparatus shown in FIG. 2, and if the number of turns of the secondary winding (Sh) of the resonant transformer (Th) of the discharge lamp lighting apparatus shown in FIG. 1 is equal to the number of turns of the secondary winding (Sh) and also to the number of turns of secondary winding (Sh') of the resonant transformer (Th) of the discharge lamp lighting apparatus shown in FIG. 2, then the discharge lamp lighting apparatus shown in FIG. 2 is more advantageous than the discharge lamp lighting apparatus shown in FIG. 1 since the voltage applied to the discharge lamp (Ld) from the discharge lamp lighting apparatus shown in FIG. 2 is twice greater than the voltage applied from the discharge lamp lighting apparatus shown in FIG. 1. This means that since the same voltage is applied to the discharge lamp (Ld), each circuit element in the discharge lamp lighting apparatus shown in FIG. 2 is subjected to a half voltage applied to the circuit elements in the discharge lamp lighting apparatus shown in FIG. 1, so that it is easier to design withstand voltages of the respective circuit elements.

Figure 3:
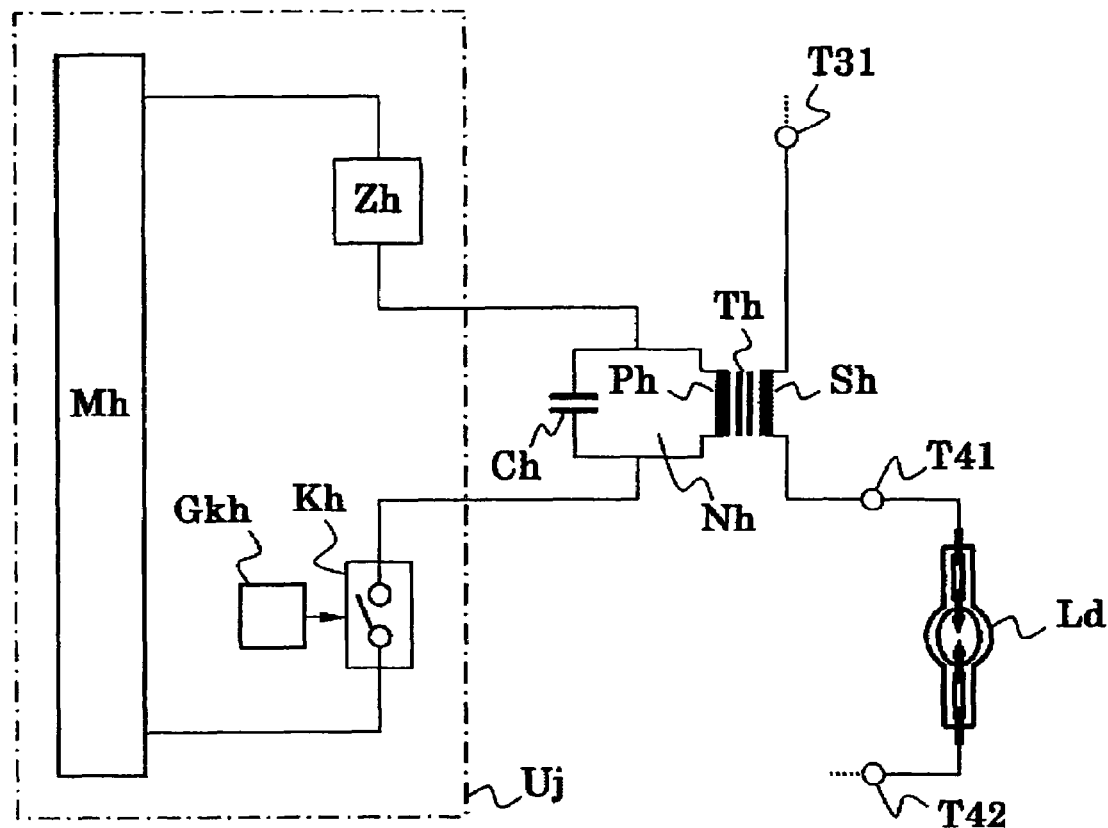
FIG. 3 is a schematic block diagram showing a part of a discharge lamp lighting apparatus according to an embodiment.

Now, referring to a schematic block diagram shown in FIG. 3, a discharge lamp lighting apparatus according to an embodiment is described below. FIG. 3 shows an example of the periodic voltage applying section (Uj). The resonant transformer (Th), the resonant capacitor (Ch), and the discharge lamp (Ld) are also shown in FIG. 3 to provide an easy understanding of related elements in comparison with FIG. 1.

In the present embodiment, to apply a periodically varying voltage to the parallel resonant circuit (Nh), a resonance driving power source (Mh) is periodically connected and disconnected to and from the parallel resonant circuit (Nh) by using, for example, a resonance driving switch element (Kh) such as a MOSFET or a bipolar transistor. The operation of the resonance driving switch element (Kh) is controlled by a gate driving circuit (Gkh). Since at a moment at which the resonance driving switch element (Kh) enters an on-state, a surge current may flow through the resonant capacitor (Ch). It is desirable to insert a resonance driving current limiting element (Zh) such as a resistor to limit surge current.

The on/off of the resonance driving switch element (Kh) is set to be equal or nearly equal to a frequency obtained by dividing the resonant frequency of the parallel resonant circuit (Nh) by the order of the resonance mode, that is, an on/off frequency of the resonance driving switch element (Kh) in the case of the fundamental waveform resonance mode. It is desirable that the on-period in the on/off operation of the resonance driving switch element (Kh) be set to be equal to or less than a half the period of the resonance oscillation of the parallel resonant circuit (Nh) regardless of the order of the resonance mode. The specific value of the on-period may be properly determined based on the actual circuit.

As for the resonance driving power source (Mh), an appropriate DC power supply may be used, for example, the output of the power supply circuit (Ux) described above may be used as the resonance driving power source (Mh).

Figure 4:
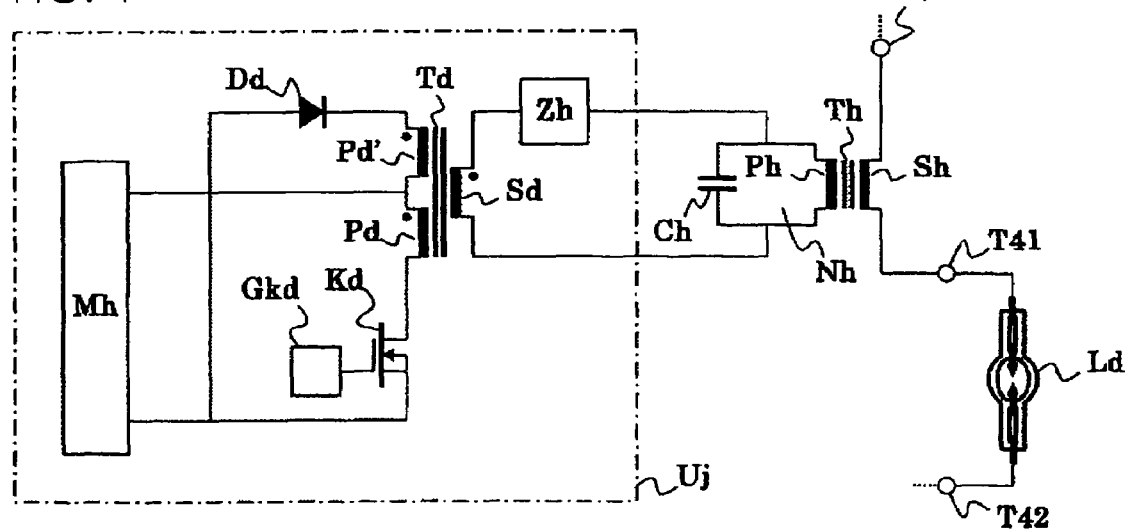
FIG. 4 is a schematic diagram showing a part of a discharge lamp lighting apparatus according to an embodiment.

Referring to a schematic block diagram shown in FIG. 4, a discharge lamp lighting apparatus according to another embodiment is described below. FIG. 4 shows the structure of the periodic voltage applying section (Uj) as an example. The resonant transformer (Th), the resonant capacitor (Ch), and the discharge lamp (Ld) are also shown in FIG. 4 to provide an easy understanding of related elements in comparison with FIG. 1.

In the configuration shown in FIG. 3, since the voltage applied to the parallel resonant circuit (Nh) can be equal, at most, to the voltage of the resonance driving power source (Mh), the voltage applied to the discharge lamp (Ld) may not be sufficiently high enough depending on the voltage of the resonance driving power source (Mh). Furthermore, in the configuration shown in FIG. 3, it is necessary that the resonance driving switch element (Kh) and the parallel resonant circuit (Nh) be connected in series. However, the series connection of the switch element and the parallel resonant circuit (Nh) may result in a disadvantage depending on the location of the switch element in the circuit. In particular, such a disadvantage may occur when the switch element also serves as a switch element disposed in the inverter (Ui).

The above-described problem can be avoided by disposing a resonance driving transformer (Td) having a primary winding (Pd) and a secondary winding (Sd) such that the primary winding (Pd) is driven by a transformer driving switch element (Kd) controlled by a gate driving circuit (Gkd) whereby a voltage is applied to the parallel resonant circuit (Nh) via the secondary winding (Sd). In this configuration, the voltage applied to the parallel resonant circuit (Nh) can be set to a proper value by appropriately setting the ratio of the number of turns of the primary winding (Pd) to the number of turns of the secondary winding (Sd). The parallel resonant circuit (Nh) and the transformer driving switch element (Kd) may be DC-isolated from each other by forming such a transformer (Td) structure that the primary winding (Pd) and the secondary winding (Sd) are isolated from each other.

The resonance driving transformer (Td) does not necessarily need to have only one primary winding but may have a plurality of primary windings. In the present embodiment as shown in FIG. 4, the resonance driving transformer (Td) has an additional primary winding (Pd') that allows magnetic energy stored in the transformer to be returned to the resonance driving power source (Mh) via a current flowing through a diode (Dd) when the transformer driving switch element (Kd) is turned off whereby the resonance driving transformer (Td) is reset. The configuration does not necessarily need to include only one transformer driving switch element but may include a plurality of transformer driving switch elements. For example, as described later, a driving function of the resonance driving transformer (Td) may be realized by two switching elements in the embodiment in which a switching element also serves as the transformer driving switch element.

Figure 5:
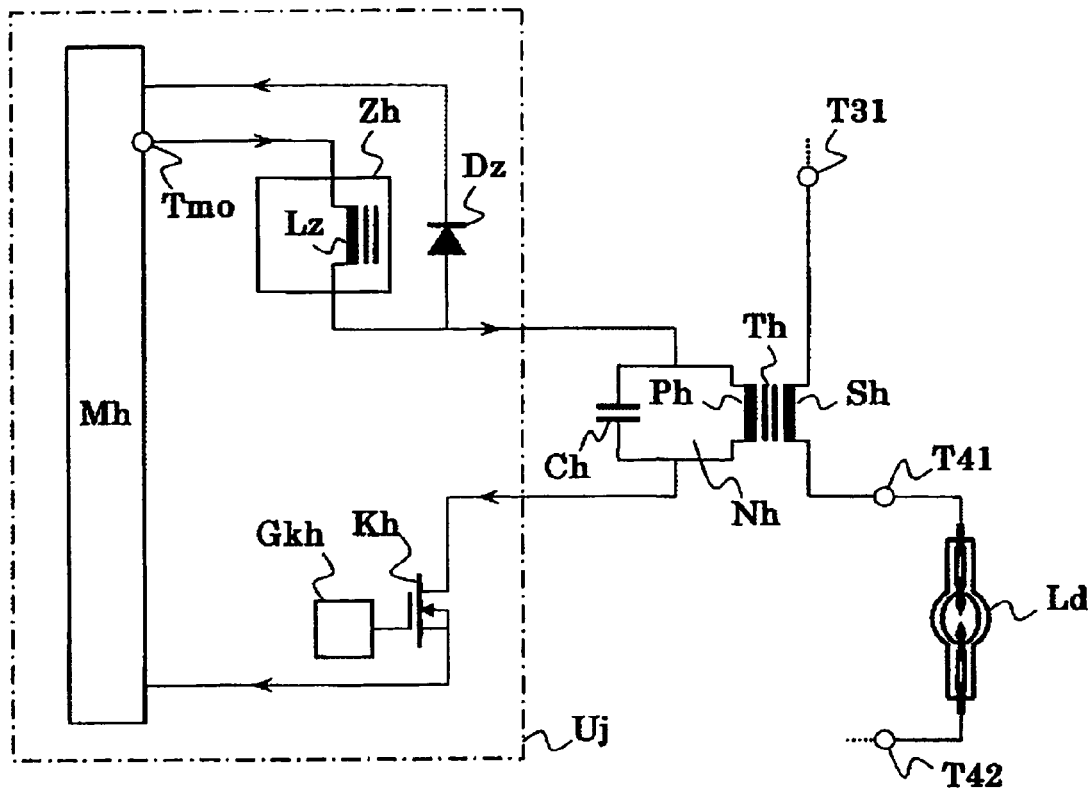
FIG. 5 is a schematic diagram showing a part of a discharge lamp lighting apparatus according to an embodiment.

Referring to a schematic block diagram shown in FIG. 5, a discharge lamp lighting apparatus according to another embodiment of the present invention is described below. FIG. 5 shows the resonance driving current limiting section (Zh). The resonant transformer (Th), the resonant capacitor (Ch), and the discharge lamp (Ld) are also shown in FIG. 5 to provide an easy understanding of related elements in comparison with FIG. 1.

As described above, a resistor may be used as the resonance driving current limiting means (Zh). However, when a large effective current flows through the resistor, a great loss occurs and accordingly a large amount of heat is generated, so that it is difficult to use the resistor as the resonance driving current limiting means (Zh). To avoid the above problem, an impedance element including an inductance element such as a coil may be used as the resonance driving current limiting means (Zh). The current limiting capability of the resonance driving current limiting means (Zh) is achieved, at least partly, by the impedance thereof. Furthermore, the resonance driving current limiting means (Zh) functions such that when the resonance driving switch element (Kh) controlled by the gate driving circuit (Gkh) is turned off and the current supply to the parallel resonant circuit (Nh) is stopped, the magnetic energy stored in the inductive element is regeneratively returned in the form of a current through the regenerative diode (Dz) to the resonance driving power source (Mh), thereby avoiding the problem described above.

In case in which a simple coil is used as the inductance element described above, it is desirable that the path through which the regenerative current returns to the resonance driving power source (Mh) be connected not to an output node (Tmo) of the resonance driving power source (Mh) because the connection of the path to the output node (Tmo) results in formation of a closed loop including the inductance element and the regenerative diode (Dz), so that a circulating current continues to flow therein.

More specifically, for example, the path through which the regenerative current returns to the resonance driving power source (Mh) may be connected to a node isolated by a switch element or the like from the output node (Tmo). In an embodiment described later, in view of the above, a resonance driving power source (Mh) is connected to an output node (T11) of a power supply circuit (Ux), and a regenerative current path is connected to an input node (T01) of the power supply circuit (Ux).

The resonance driving current limiting section (Zh) may also include a capacitor and/or a resistor in addition to the inductance element such as a coil. In contrast to a coil that does not allow a current to quickly start to flow in response to starting of a resonance driving current, a capacitor allows a current to quickly start to flow. Therefore, the resonance driving current limiting unit (Zh) in which a coil is connected in parallel to a series connection of a capacitor and a resistor has particularly good characteristics.

Figure 6:
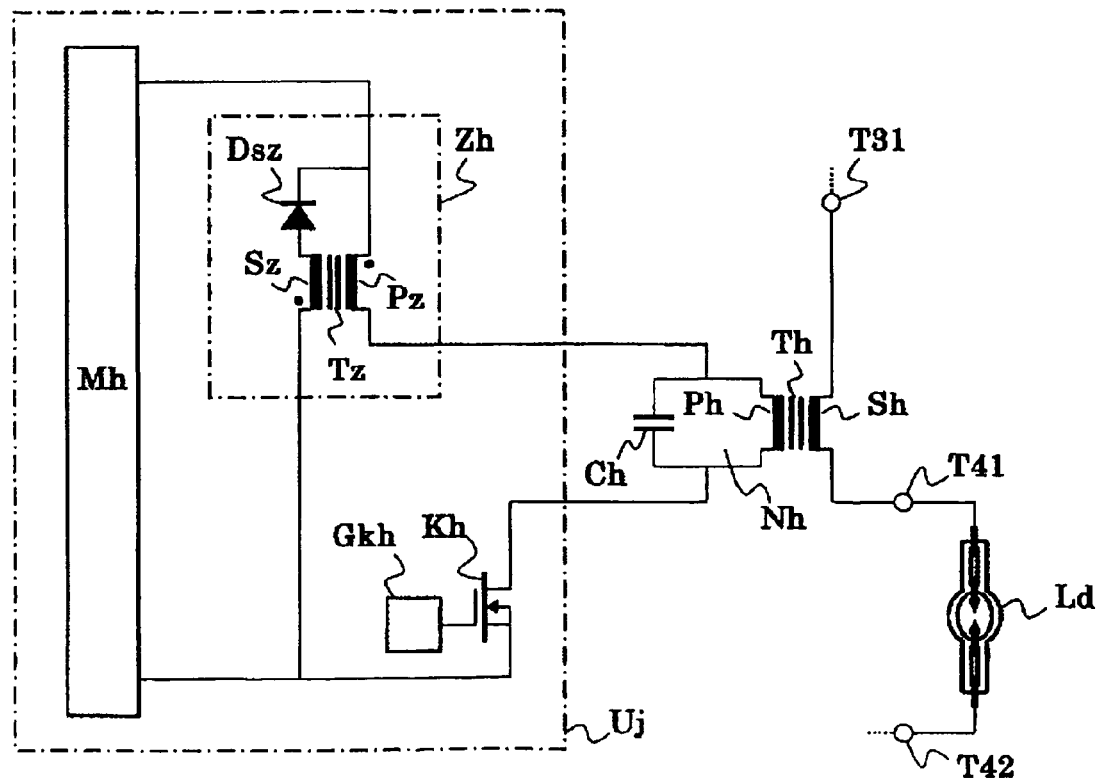
FIG. 6 is a schematic diagram showing a part of a discharge lamp lighting apparatus according to an embodiment.

Referring to a schematic block diagram shown in FIG. 6, a discharge lamp lighting apparatus according to another embodiment is described below. FIG. 6 shows the resonance driving current limiting section (Zh) in which the resonant transformer (Th), the resonant capacitor (Ch), and the discharge lamp (Ld) are also shown therein to provide an easy understanding of related elements in comparison with FIG. 1.

In this embodiment shown in FIG. 6, a resonance driving current is limited by the inductance of a primary winding (Pz) of a current limiting/returning transformer (Tz). Furthermore, in this embodiment, when a resonance driving switch element (Kh) controlled by a gate driving circuit (Gkh) is turned off and a current supply to a parallel resonant circuit (Nh) is stopped, magnetic energy stored in the current limiting/returning transformer (Tz) is returned in the form of a regenerative current via a regenerative diode (Dsz) from a secondary winding (Sz) to a resonance driving power source (Mh). In this configuration, no closed loop including the primary winding (Pz) and the regenerative diode (Dsz) is formed, so that this configuration is advantageous in that the regenerative current path can be connected to an output node or any other arbitrary point of the resonance driving power source (Mh).

Although in the specific example shown in FIG. 6, the primary winding (Pz) is disposed such that the primary winding (Pz) is connected to the output node of the resonance driving power source (Mh), the location of the primary winding (Pz) is not limited to that shown in FIG. 6. For example, the primary winding (Pz) may be disposed between the parallel resonant circuit (Nh) and the resonance driving switch element (Kh).

Figure 7:
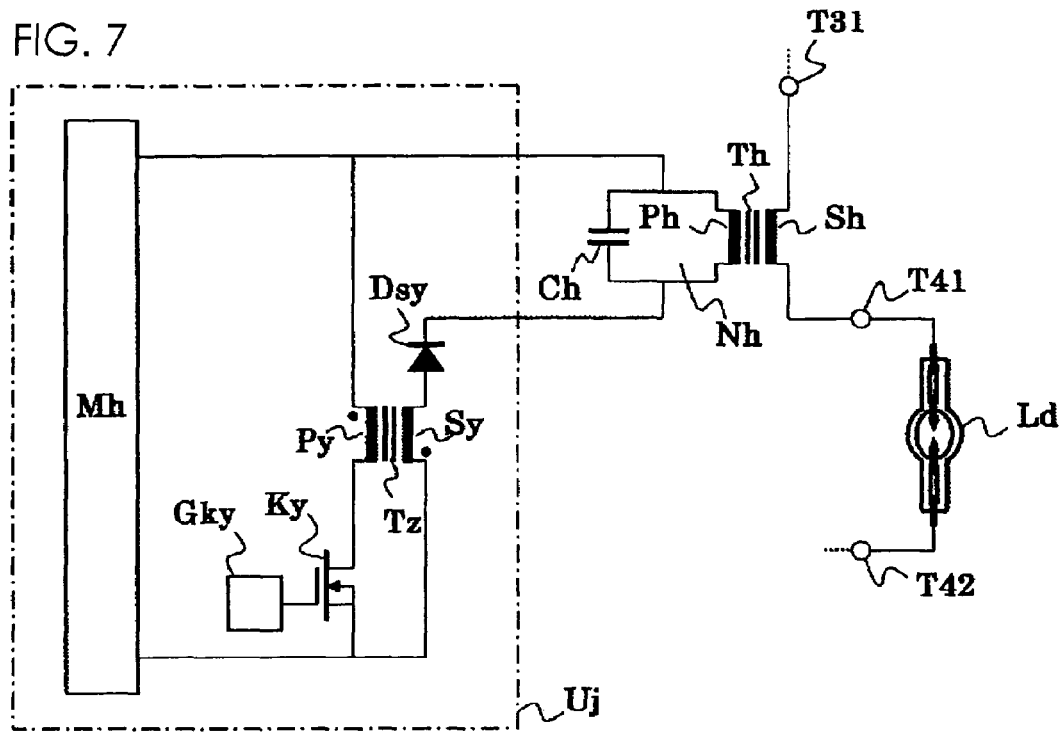
FIG. 7 is a schematic diagram showing a part of a discharge lamp lighting apparatus according to an embodiment.

Referring to a schematic block diagram shown in FIG. 7, a discharge lamp lighting apparatus according to another embodiment is described below. FIG. 7 shows the periodic voltage applying means (Uj). in which the resonant transformer (Th), the resonant capacitor (Ch), and the discharge lamp (Ld) are also shown in FIG. 7 to provide an easy understanding of related elements in comparison with FIG. 1.

In this embodiment shown in FIG. 7, during a period in which a transformer driving switch element (Ky) controlled by a gate driving circuit (Gky) is in an on-state, a current is supplied from the resonance driving power source (Mh) into a primary winding (Py) of a resonance driving energy supplying transformer (Tz) thereby storing magnetic energy in the resonance driving energy supplying transformer (Tz).

When the transformer driving switch element (Ky) is turned off, the magnetic energy stored in the resonance driving energy supplying transformer (Tz) is returned in the form of a regenerative current flowing through a regenerative diode (Dsy) from a secondary winding (Sy) to the resonance driving power source (Mh) in a so-called flyback operation, and a voltage is applied to a parallel resonant circuit (Nh).

In this configuration, the voltage applied to the parallel resonant circuit (Nh) is set to an arbitrary value by appropriately setting the ratio of the number of turns of the primary winding (Py) to the number of turns of the secondary winding (Sy). Furthermore, in this configuration, the transformer may be constructed in a form in which the primary winding (Py) and the secondary winding (Sy) are isolated from each other thereby allowing the parallel resonant circuit (Nh) to be DC-isolated from the transformer driving switch element (Ky). This results in an increase in the degree of flexibility of design of the circuit configuration.

Figure 8:
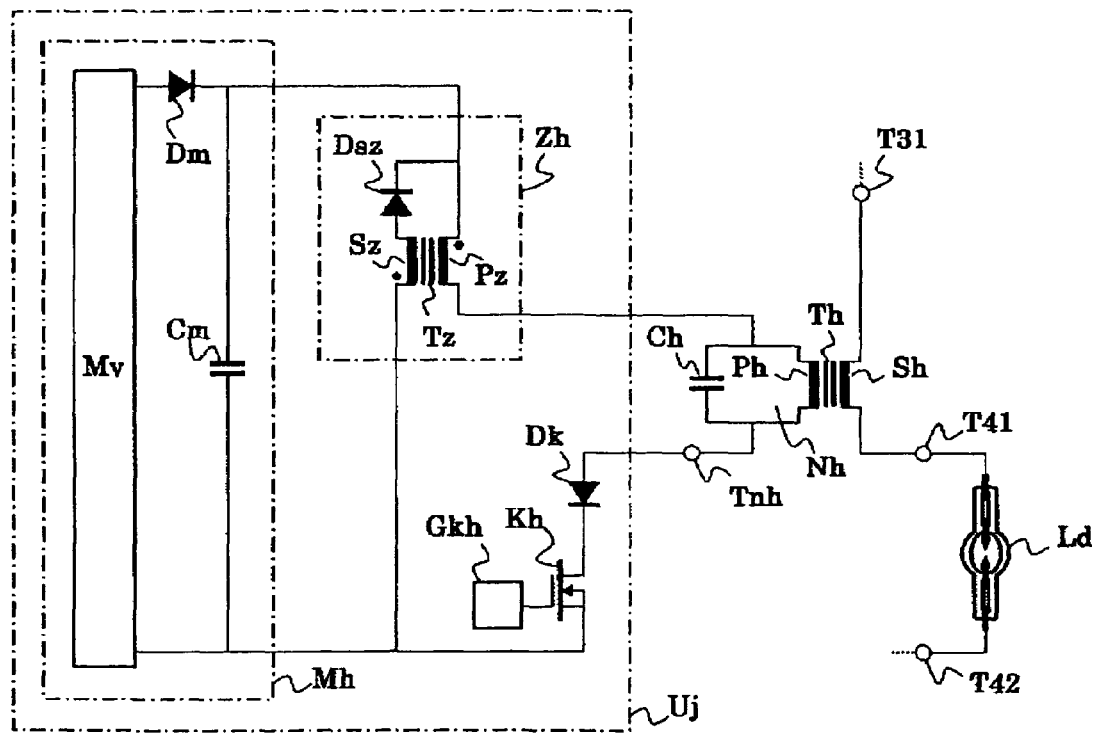
FIG. 8 is a schematic diagram showing a part of a discharge lamp lighting apparatus according to an embodiment.

Referring to a schematic diagram shown in FIG. 8, a discharge lamp lighting apparatus according to another embodiment is described below. FIG. 8 shows the periodic voltage applying section (Uj) and the resonance driving power source (Mh). in which the resonant transformer (Th), the resonant capacitor (Ch), and the discharge lamp (Ld) are also shown FIG. to provide an easy understanding of related elements in comparison with FIG. 1.

In this embodiment shown in FIG. 8, the resonance driving power source (Mh) is configured such that a current output from a DC power source (Mv) is supplied to a parallel resonant circuit (Nh) via a current supply diode (Dm) and a smoothing capacitor (Cm), and resonance driving current limiting section (Zh) is configured such that magnetic energy stored in a transformer included in the resonance driving current limiting section (Zh) is regenerative.

In this configuration, since during a period in which magnetic energy is stored in the transformer, a charge is released from the smoothing capacitor (Cm) to the parallel resonant circuit (Nh), the voltage of the smoothing capacitor (Cm) tends to decrease. However, because a charge is supplied from the DC power source (Mv) via the current supply diode (Dm), the reduced amount of the voltage of the smoothing capacitor (Cm) is limited to the amount depending on the output impedance of the DC power source (Mv). On the other hand, when the stored magnetic energy is regeneratively returned to the smoothing capacitor (Cm), since a current flowing back to the DC power source (Mv) is prevented by the current supply diode (Dm), the voltage of the smoothing capacitor (Cm) is boosted up to a value higher than the voltage of DC power source (Mv).

The step-up of the voltage of the resonance driving power source (Mh) is advantageous when a voltage applied to the discharge lamp (Ld) is increased. The degree of step-up of the voltage depends on the energy consumed by the parallel resonant circuit (Nh), energy regeneratively returned to the smoothing capacitor (Cm) during one cycle period, and the output impedance of the DC power source (Mv). The DC power source (Mv) may be realized by using electrical power output from the output nodes or the input nodes of the power supply circuit (Ux).

Furthermore, in the configuration shown in FIG. 8, an amplitude clamp preventing diode (Dk) is connected to a resonance driving switch element (Kh) which is one of elements of the periodic voltage applying means (Uj). This enhances a resonant phenomenon, that is, the voltage applied to the discharge lamp (Ld) is further increased. More specifically, for example, in a case in which a MOSFET is used as the resonance driving switch element (Kh), the MOSFET has a parasitic diode (not shown) with a forward direction from a source electrode to a drain electrode. When resonance grows and the voltage of the node (Tnh) is going to become negative, if the periodic voltage applying section (Uj) does not have the amplitude clamp preventing diode (Dk), then the voltage of the node (Tnh) is clamped at about 0 V by the parasitic diode. However, in the configuration shown in FIG. 8, the amplitude clamp preventing diode (Dk) disposed in the periodic voltage applying section (Uj) prevents the clamping from occurring.

When a device having no parasitic diode, such as a bipolar transistor, is used, it is desirable to connect a diode similar to the parasitic diode described above in parallel and in a reverse direction to the bipolar transistor, because the diode prevents the bipolar transistor from being damaged by a reversely applied voltage whereby it is possible to achieve resonance enhancement by the amplitude clamp preventing diode (Dk) without causing the bipolar transistor to be damaged.

Figure 9:
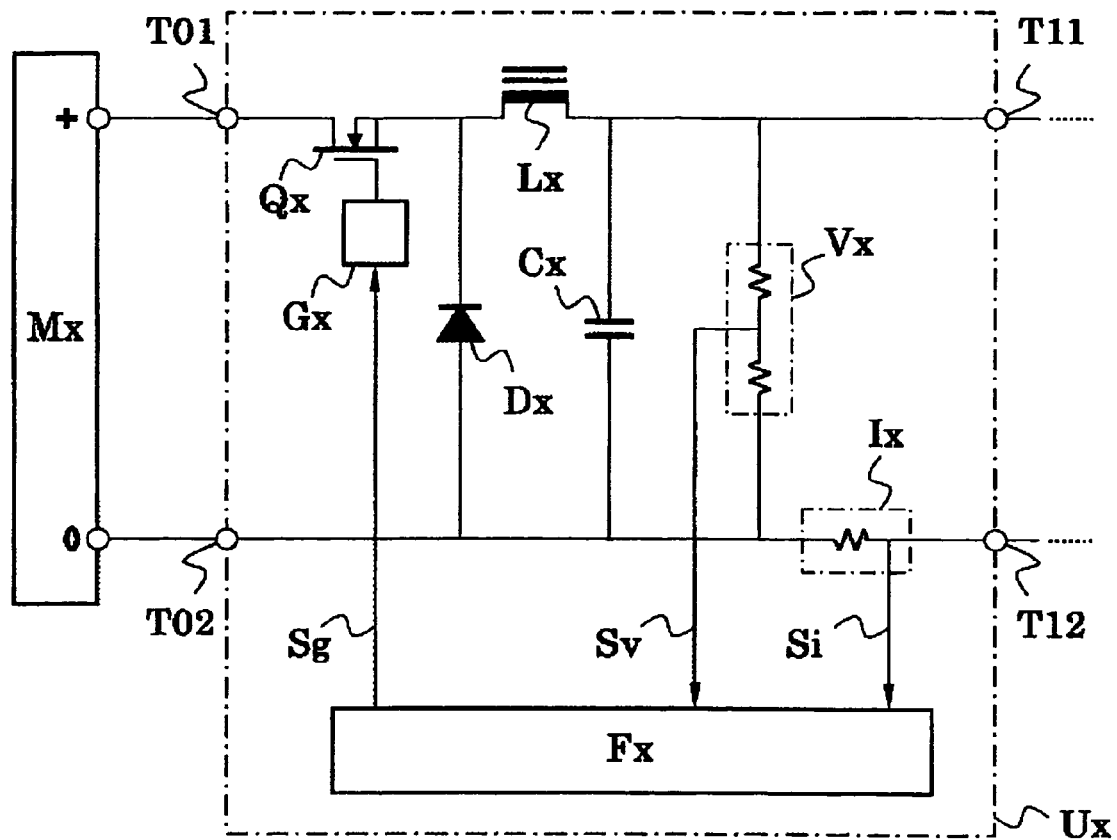
FIG. 9 is a schematic diagram showing a part of a discharge lamp lighting apparatus according to an embodiment.

Now, another embodiment of the present invention is described below with reference to FIG. 9 which is a schematic diagram showing a configuration of a power supply circuit (Ux) used in the discharge lamp lighting apparatus. This power supply circuit (Ux) is mainly comprised of a step-down chopper circuit, and is operated with a voltage supplied from a DC power source (Mx) such as a PFC so as to control the amount of power supplied to the discharge lamp (Ld). In this power supply circuit (Ux), a current from the DC power source (Mx) is turned on/off by a switch element (Qx) such as a FET so that a smoothing capacitor (Cx) is charged via a choke coil (Lx) and a charged voltage is applied to the discharge lamp (Ld) whereby a current passes through the discharge lamp (Ld).

During a period in which the switch element (Qx) is in an on-state, a current passes through the switch element (Qx) whereby the smoothing capacitor (Cx) is directly charged, a current is supplied to a load, that is, the discharge lamp (Ld), and energy is stored in the form of a magnetic flux in the choke coil (Lx). On the other hand, during a period in which the switch element (Qx) is in an off-state, the energy stored in the form of the magnetic flux in the choke coil (Lx) charges the smoothing capacitor (Cx) via a flywheel diode (Dx) and a current is supplied to the discharge lamp (Ld).

In this power supply circuit (Ux) of the step-down chopper type, the amount of power supplied to the discharge lamp can be adjusted by controlling the duty cycle, that is, the ratio of the on-period of the switch element (Qx) to the operation cycle period of the switch element (Qx). More specifically, a power supply control circuit (Fx) generates a gate driving signal (Sg) with a particular duty cycle and controls the gate electrode of the switch element (Qx) via a gate driving circuit (Gx) thereby controlling the turning-on/off of the current supplied from the DC power source (Mx).

The lamp current flowing between the electrodes (E1 and E2) of the discharge lamp (Ld) is detected by a lamp current detection section (Ix), and the voltage between the electrodes (E1 and E2) is detected by a lamp voltage detection section (Vx). The lamp current detection section (Ix) can be easily realized using a shunt resistor, and the lamp voltage detection section (Vx) can be easily realized using voltage divider resistors.

A lamp current detection signal (Si) output from the lamp current detection means (Ix) and a lamp voltage detection signal (Sv) output from the lamp voltage detection section (Vx) are input to the power supply control circuit (Fx). During an initial period in which no lamp current flows after the lamp operation is started, the power supply control circuit (Fx) generates the gate driving signal (Sg) in a feedback control manner so as to output a particular voltage specified as a no-load open-circuit voltage to the lamp. If a discharge current starts to flow after the lamp operation is started, the power supply control circuit (Fx) generates the gate driving signal (Sg) in a feedback control manner so that a specified target lamp current is output. The target lamp current is basically determined depending on the voltage of the discharge lamp (Ld) such that the electrical power supplied to the discharge lamp (Ld) becomes equal to a specified value. However, during a particular period immediately after the start of the lamp operation, the voltage of the discharge lamp (Ld) is low and the electrical power supplied to the discharge lamp (Ld) is smaller than the rated power. Thus, during this particular period, the target lamp current is controlled such that the lamp current does not exceed an upper limit called an initial maximum current. In this period, as the temperature of the discharge lamp (Ld) increases, the voltage of the discharge lamp (Ld) increases. If the voltage of the discharge lamp (Ld) reaches a value at which it is possible to achieve the specified power by a current lower than the initial maximum current, the operation is smoothly shifted to a mode in which the specified electrical power is supplied to the discharge lamp (Ld).

Figure 10:
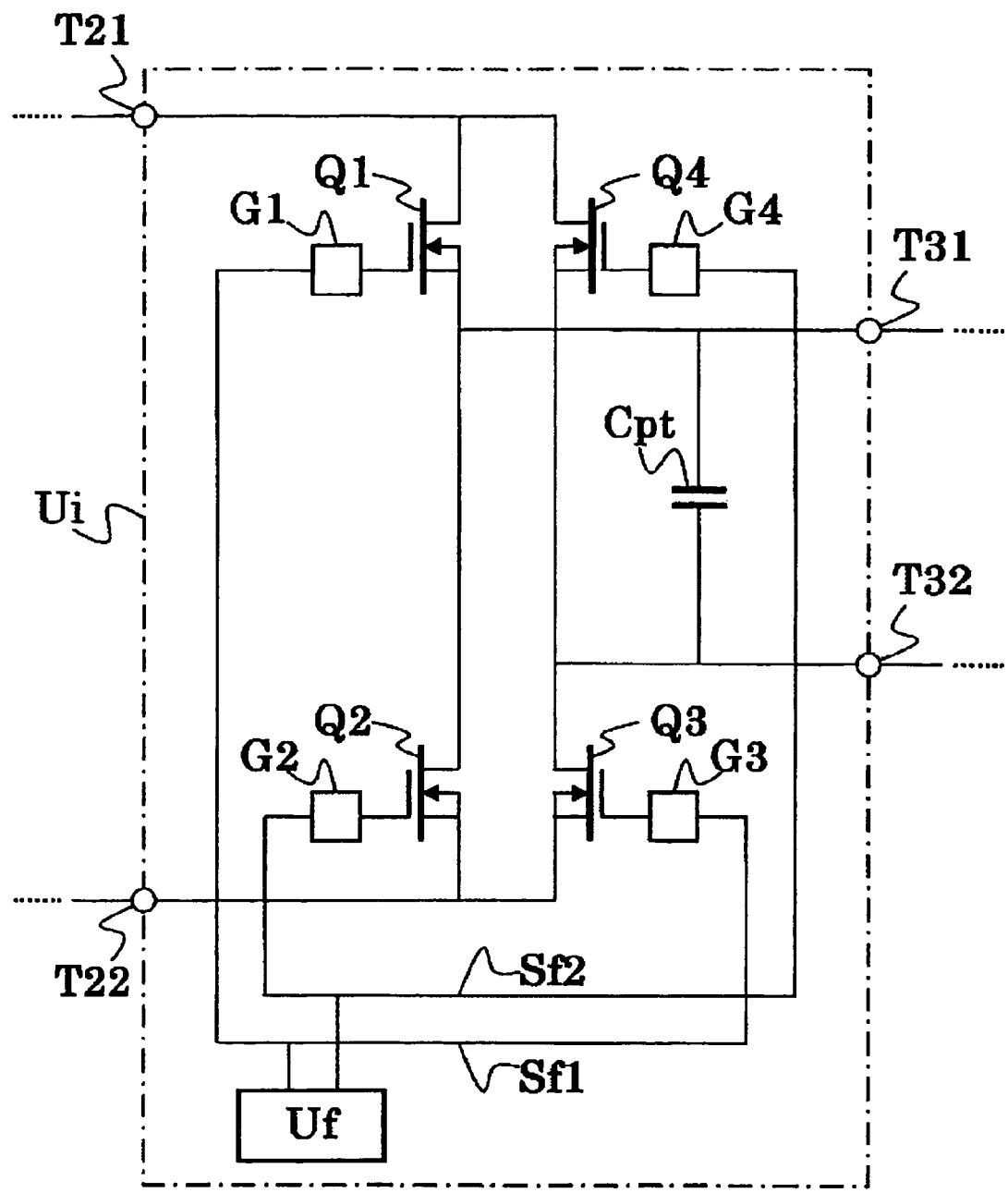
FIG. 10 is a schematic diagram showing a part of a discharge lamp lighting apparatus according to an embodiment.

FIG. 10 is a schematic diagram showing an inverter (Ui) for use in the discharge lamp lighting apparatus, according to an embodiment. This inverter (Ui) is configured in the form of a full bridge circuit using switch elements (Q1, Q2, Q3, and Q4) such as FETs. The switch elements (Q1, Q2, Q3, and Q4) are respectively driven by corresponding gate driving circuits (G1, G2, G3, and G4). The gate driving circuits (G1, G2, G3, and G4) are controlled by inverter control signals (Sf1 and Sf2) generated by an inverter control circuit (Uf) such that in a phase in which two switch elements located at first diagonal positions, for example, the switch element (Q1) and the switch element (Q3), are in an on-state, the other two switch elements (Q2 and Q4) located at second diagonal positions are maintained in an off-state, while in a phase in which the two switch elements (Q2 and Q4) located at the second diagonal positions are in the on-state, the two switch elements (Q1 and Q3) at the first diagonal positions are maintained in the off-state. When the switching between the above-described two phases is performed, a particular period called a dead time is inserted during which all switch elements (Q1, Q2, Q3, and Q4) are turned off.

In a case in which MOSFETs are used as the switch elements (Q1, Q2, Q3, and Q4), each MOSFET has a parasitic diode (not shown) with a forward direction from a source electrode to a drain electrode. When a device having no parasitic diode, such as a bipolar transistor, is used, it is desirable to connect a diode similar to the parasitic diode described above in parallel and in a reverse direction to each bipolar transistor, because the diode prevents the bipolar transistor from being damaged by a reverse voltage generated when an induced current flows through an inductance element at an end stage of the inverter (Ui) at a transition between the two phases or in the dead time.

Figure 11:
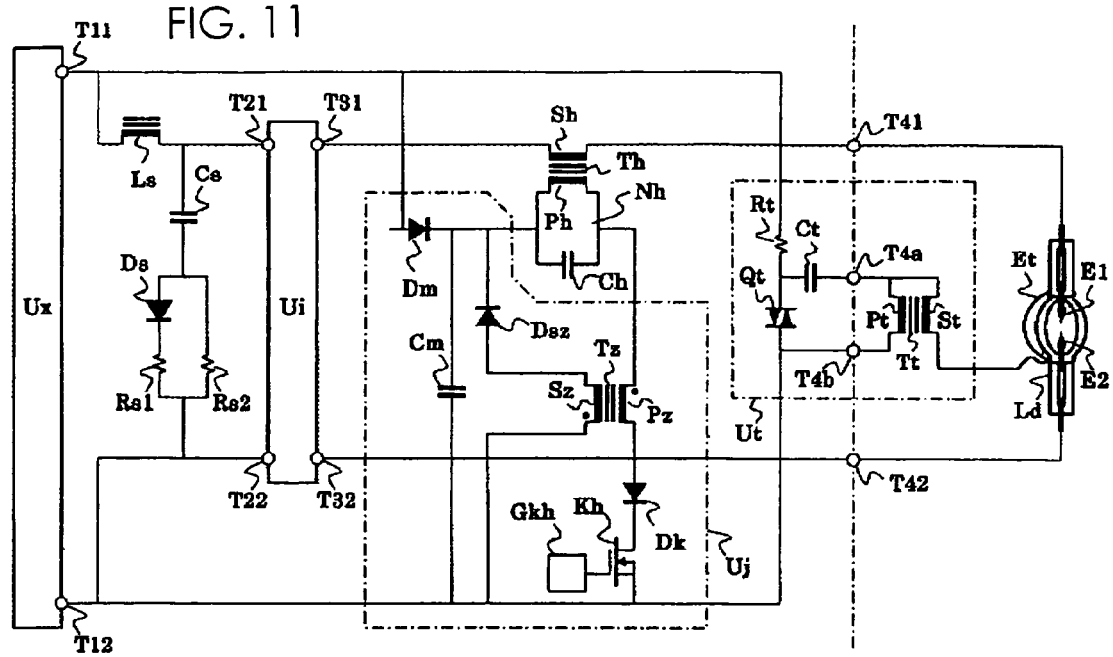
FIG. 11 is a schematic diagram showing a discharge lamp lighting apparatus according to an embodiment.

FIG. 11 is a diagram showing a discharge lamp lighting apparatus according to an embodiment in which the techniques described above with reference to FIGS. 3, 6, and 8 are combined.

In a periodic voltage applying section (Uj), a resonance driving power source receives electrical power from a power supply circuit (Ux) serving as a DC power source and supplies a voltage to a parallel resonant circuit (Nh) comprising a resonant capacitor (Ch) and a primary winding (Ph) of a resonant transformer (Th) via a current supply diode (Dm) and a smoothing capacitor (Cm). A resonance driving switch element (Kh) using a MOSFET or the like is controlled by a gate driving circuit (Gkh) such that the resonance driving switch element (Kh) is periodically turned on and off. When the resonance driving switch element (Kh) is in an on-state, a driving current is supplied to the parallel resonant circuit (Nh) via a primary winding (Pz) of a current limiting/returning transformer (Tz). When the resonance driving switch element (Kh) is turned off, magnetic energy stored in the current limiting/returning transformer (Tz) is returned in the form of a regenerative current from a secondary winding (Sz) of the current limiting/returning transformer (Tz) to the smoothing capacitor (Cm) via a regenerative diode (Dsz).

Because the resonance driving switch element (Kh) is provided so as to apply the voltage to the parallel resonant circuit (Nh) via an amplitude clamp preventing diode (Dk), when resonance of the parallel resonant circuit (Nh) grows and the potential of the anode of the amplitude clamp preventing diode (Dk) becomes negative in a particular period, the amplitude clamp preventing diode (Dk) prevents the parasitic diode of the resonance driving switch element (Kh) from clamping the negative potential, and thus the resonance of the parallel resonant circuit (Nh) can further grow. The amplitude clamp preventing diode (Dk), the current supply diode (Dm), the smoothing capacitor (Cm), and the regenerative diode (Dsz) cooperate to effectively boost up the voltage of the smoothing capacitor (Cm). This further enhances the growth of the resonance of the parallel resonant circuit (Nh).

As described above, the periodic voltage applying section (Uj) operates so as to raise the resonance of the parallel resonant circuit (Nh). As a result, the amplitude of the voltage of the primary winding (Ph) of the resonant transformer (Th) increases, so that a high AC voltage is generated in the secondary winding (Sh) of the resonant transformer (Th). This high voltage is superimposed on the no-load open-circuit voltage which is supplied from the power supply circuit (Ux) and which appears between output nodes (T31 and T32) of an inverter (Ui), and applied to the main-discharge electrodes (E1 and E2) of the discharge lamp (Ld), which are connected to nodes (T41 and T42).

On the external trigger type discharge lamp (Ld), an auxiliary electrode (Et) is provided so as not to be in contact with a discharge space, in addition to the main-discharge electrodes (E1 and E2). A high voltage generated in a secondary winding (St) of a starter transformer (Tt) in a starter circuit (Ut) is applied to the auxiliary electrode (Et). In the starter circuit (Ut), a capacitor (Ct) is relatively slowly by the no-load open-circuit voltage supplied from the DC power source serving as the power supply circuit (Ux) via a resistor (Rt) and a primary winding (Pt) of the starter transformer (Tt). When the charged voltage of the capacitor (Ct) reaches a particular voltage, a switch element (Qt) using a voltage sensitive device such as SIDAC turns on. As a result, the voltage of the capacitor (Ct) is applied in the form of a pulse to the primary winding (Pt). This causes a high voltage to be generated in the secondary winding (St) of the starter transformer (Tt). As the switch element (Qt), a switch element having a trigger terminals, such as an SCR, similar to that used in a starter circuit (Ut') described later in FIG. 12 may also be employed.

In the above-described state in which the high AC voltage output from the resonant transformer (Th) is applied to the main-discharge electrodes (E1 and E2) of the discharge lamp (Ld), when the high voltage pulse output from the starter transformer (Tt) is applied to the auxiliary electrode (Et) of the discharge lamp (Ld) in the above-described manner, the main discharge starts in the discharge lamp (Ld) with a very high probability. Once the main discharge starts in the discharge lamp (Ld) and there is substantially no possibility that the discharge will go out, the periodical turning-on/off operation of the resonance driving switch element (Kh) may be stopped.

However, when the main discharge is in a condition or a period in which there is possibility that the main discharge may go out, the periodical turning-on/off operation of the resonance driving switch element (Kh) may be continued after the main discharge started in the discharge lamp (Ld). In this case, during the main discharge in the discharge lamp (Ld), the impedance between the electrodes (E1 and E2) is low, and thus the parallel resonant circuit (Nh) has a low Q value. Therefore, in this state, the resonant transformer (Th) does not generate a high voltage. However, since if the main discharge goes out, the parallel resonant circuit (Nh) returns into a high Q state, the resonance of the parallel resonant circuit (Nh) to grow, so that, a high AC voltage is generated in the resonant transformer (Th), and the main discharge is restarted.

The discharge status of the discharge lamp may be detected on the basis of the lamp voltage detection signal (Sv), and the operation may be controlled depending on the discharge status such that the operation of the resonance driving switch element (Kh) is stopped when the discharge lamp has a normal discharge, but the operation of the resonance driving switch element (Kh) is restarted when the main discharge goes out.

In the case of the externally-triggered lamp shown in FIG. 11, the current path for the main discharge does not include the secondary winding (St) of the starter transformer (Tt). Therefore, in a steady lighting state, the secondary winding (Sh) of the resonant transformer (Th) is only the inductance component included in a section following the inverter (Ui). Thus, use of the externally-triggered lamp is very advantageous in that the fluctuation of the light flux at polarity transitions of the voltage applied to the lamp can be minimized.

When the discharge starts, the output voltage of the power supply circuit (Ux) should be quickly lowered from the no-load open-circuit voltage to a low arc discharge voltage specified for the particular discharge lamp (Ld). At this abrupt transition of the voltage, an inrush current due to the charge stored in the smoothing capacitor (Cx) can flow. To suppress the inrush current, a choke coil (Ls) is provided between the node (T11) and the node (T21). A capacitor (Cs), a diode (Ds), and resistors (Rs1 and Rs2) are provided to prevent or suppress a short break, an overshoot, or a vibration of the lamp current at a polarity transition of the inverter (Ui) due to the inductance of the secondary winding (Sh) of the resonant transformer (Th) in the steady lighting state without causing an increase in the inrush current. More specifically, the resistors (Rs1 and Rs2) are for reducing the inrush current and damping the vibration, and the diode (Ds) is for switching the operating resistance value between a period in which the capacitor (Cs) is charged and a period in which the capacitor (Cs) is discharged.

The values of the parameters described above may be determined by trial and error for a particular circuit actually used. Although the choke coil (Ls), the capacitor (Cs), the diode (Ds), and the resistors (Rs1 and Rs2) are not shown in discharge lamp lighting apparatuses in figures elsewhere in the present specification, it is desirable to provide these circuit elements if needed.

The values of the circuit parameters of the discharge lamp lighting apparatus shown in FIG. 11 (or FIG. 9) may be determined, for example, as follows.

Lx: 1.08 mH
Cx: 470 nF
Ls: 388 µH
Cs: 1 µF
Rs1: 22Ω
Rs2: 33Ω
Cm: 100 nF
Ph: 8.6 µH
Sh: 38 µH
Ch: 33 nF
Pz: 66 µH
Sz: 66 µH

In the experiment in which the circuit parameters were set to above-described values, the parallel resonant circuit (Nh) had a resonant frequency of about 300 kHz. The resonance driving switch element (Kh) was operated at a frequency whose third harmonic frequency was equal to the resonant frequency described above. When the output voltage of the power supply circuit (Ux) was set to 200 V, a voltage higher than 800 V in peak-to-peak value was applied to the discharge lamp (Ld) in the starting operation.

Because a high voltage is applied over a path from the secondary winding (St) of the starter transformer (Tt) to the auxiliary electrode (Et) of the discharge lamp (Ld), it is desirable that this path should be set to be as short as possible. In this respect, in FIG. 11, it is advantageous that the right side position from a dot-dash line in which nodes (T41, T4a, T4b, and T42) reside be formed into a unit separated from the other part of the discharge lamp lighting apparatus.

As described above, the resonant frequency of the parallel resonant circuit (Nh) is determined by the product of the capacitance of the resonant capacitor (Ch) and the inductance of the primary winding (Ph). However, it is difficult to exactly set the resonant frequency to a predetermined value, because the capacitance and inductance can vary depending on a capacitor or an inductor used therefore, and, further because the resonant frequency is influenced by the environment associated with the secondary winding of the resonant transformer (Th), such as a cable length, the distance between the cable and other conductors, etc.

In view of the above, it is practical to employ an automatic frequency tuning method in which when the operation of the periodic voltage applying section (Uj) starts, the operating frequency of the periodic voltage applying section (Uj) is swept and controlled in a feedback control manner so as to obtain strong resonance. In this case, the initial frequency is set to an initial value sufficiently higher than the resonant frequency, so that taking into account variations of circuit element values and the frequency is swept down, or conversely, the initial frequency is set to a value sufficiently lower than the resonant frequency, so that the frequency is swept up.

In order to carry out the automatic frequency tuning method, the tuning degree of the operating frequency of the periodic voltage applying section (Uj) with respect to the resonant frequency is detected so that a tuning degree detection section generates a tuning degree signal according to the detected tuning degree. The tuning degree by the tuning degree detection section may be detected, for example, by measuring the amplitude of the voltage of the parallel resonant circuit (Nh). In this case, the amplitude may be measured, for example, by using a circuit that holds the maximum or minimum value of the voltage of the parallel resonant circuit (Nh). Alternatively, the tuning degree detection section may detect the tuning degree on the basis of phases of the operation of the periodic voltage applying section (Uj) and the operation of the parallel resonant circuit (Nh).

In the automatic frequency tuning method, the function of sweeping the operating frequency of the periodic voltage applying means (Uj) may be realized as follows.

The periodic voltage applying section (Uj) is configured to include a resonance driving oscillator whose oscillating frequency, that is, operating frequency, is determined by setting operating frequency data such that at the beginning of a starting sequence of the discharge lamp lighting apparatus, the operating frequency data is initialized to the initial frequency value described above, then in a following period in which no discharge is yet started in the lamp, the operating frequency data is increased or decreased (or maintained at the current value) with time, and in a period following first occurrence of discharge or following reoccurrence of discharge after extinction of the discharge, the operating frequency data is maintained.

In this configuration, when the discharge has been successfully started in the discharge lamp, the data indicating the operating frequency is stored. If extinction of the discharge occurs, the tuned state where the discharge had successfully started is quickly restored based on the data stored when the discharge had successfully started. This makes it unnecessary to again sweep the frequency from the initial state to find a best tuned frequency, and it becomes possible to increase the probability that the discharge is restarted successfully.

The resonance driving oscillator for use in the discharge lamp lighting apparatus may be realized using a voltage controlled oscillator (VCO, an oscillator whose oscillating frequency is controllable according to a frequency control signal) which oscillates such that the output voltage of the VCO is maintained at one level (for example, at a high level) for a fixed period, while a period in which the output voltage is at the opposite level (for example, at a low level) is variable. The frequency control signal, serving as the operating frequency data described above, is generated by an operating frequency data maintaining/changing (increasing/decreasing) section. The operating frequency data maintaining/changing section holds the output during a lamp discharge period, but the operating frequency data maintaining/changing section increases or decreases the output using an integrating circuit in accordance with the polarity (the high level or the low level) of the tuning degree signal during a no-discharge period. It is preferable that the fixed period during which the output is maintained at the one level be set to a value equal to or shorter than half the resonant oscillation period of the parallel resonant circuit (Nh), described above with reference to FIG. 3.

Alternatively, the operating frequency data maintaining/changing section may be configured using an up/down counter in which a counter value is held by disabling a clock signal input to the up/down counter during the lamp discharge period, while during the no-discharge period the clock signal is enabled and counting up or down is performed according to the polarity of the tuning degree signal. The counter value of the up/down counter is converted into an analog value (D/A conversion) and supplied as the frequency control signal to the VCO.

The up/down counter may be realized by executing a programmed on a microprocessor. The combination of the operation of the up/down counter and the operation of the VCO may be realized by using a timer/counter function of a microprocessor and by executing the programmed microprocessor.

Figure 12:
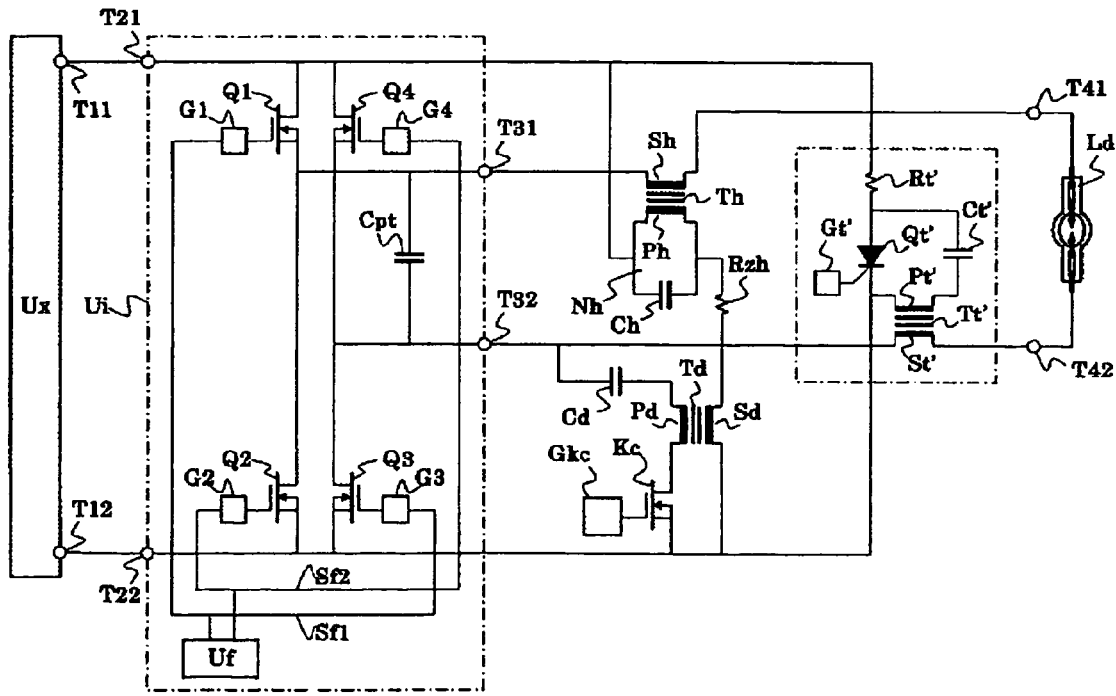
FIG. 12 is a schematic diagram showing a discharge lamp lighting apparatus according to an embodiment of the present invention.

FIG. 12 shows, schematic diagram of a discharge lamp lighting apparatus using a combination of the technique described above with reference to FIG. 4 and the technique of using a switch element in an inverter such that this switch element also functions as the transformer driving switch element.

In this discharge lamp lighting apparatus shown in FIG. 12, in the starting operation of the discharge lamp (Ld), the inverter (Ui) is operated at a frequency at which the parallel resonant circuit (Nh) is excited in a fundamental resonance mode or in a high-order resonance mode. More specifically, the switch elements (Q3) and the switch elements (Q4) are complementary and alternately turned on/off thereby driving the primary winding (Pd) of the resonance driving transformer (Td) via a capacitor (Cd) for preventing biased excitation. (Switch elements (Q1 and Q2) may be used for the above purpose instead of the switch elements (Q3 and Q4). The duty ratio of the on-period of the switch elements (Q3 and Q4) is set to a value at which the parallel resonant circuit (Nh) is excited in a specified resonance mode (the fundamental resonance mode or the high-order resonance mode). The gate driving circuit (Gkc) is controlled so that the switch element (Kc) for connecting/disconnecting the resonance driving transformer (Td) to/from the inverter (Ui) is maintained in the on-state.

A periodically varying voltage having a regained amplitude magnified by a voltage conversion is generated in the secondary winding (Sd) of the resonance driving transformer (Td), and this voltage is applied via a resistor (Rzh) serving as resonance driving current limiting section to the parallel resonant circuit (Nh) comprising the resonant capacitor (Ch) and the primary winding (Ph) of the resonant transformer (Th). As a result, a high AC voltage is generated in the secondary winding (Sh) of the resonant transformer (Th).

FIG. 12 shows the discharge lamp lighting apparatus including a serial trigger type starter circuit (Ut'), and a lamp connected to the discharge lamp lighting apparatus. In the starter circuit (Ut'), a capacitor (Ct') is charged relatively slowly by a no-load open-circuit voltage supplied from a power supply circuit (Ux) serving as a DC power source via a resistor (Rt') and a primary winding (Pt') of a starter transformer (Tt'). When the charged voltage of the capacitor (Ct') reaches a particular value, a switch element (Qt') comprising an SCR or the like is turned on by a gate driving circuit (Gt'). As a result, the voltage of the capacitor (Ct') is applied in the form of a pulse to the primary winding (Pt'), so that a high voltage pulse is generated in the secondary winding (St') of the starter transformer (Tt').

Thus, in the state in which the high AC voltage is applied to the discharge lamp (Ld) from the secondary winding (Sh) of the resonant transformer (Th) connected in series to the discharge lamp (Ld), the high voltage pulse generated in the secondary winding (St') of the starter transformer (Tt') connected in series to the discharge lamp (Ld) is superimposed on the high AC voltage. As a result, the main discharge is started in the discharge lamp (Ld) with a very high probability. After the main discharge was started, when a stable state has been reached in which the probability of extinction of the discharge is very low, the gate driving circuit (Gkc) is controlled to turn off the switch element (Kc), and the operating frequency of the inverter (Ui) is switched at a proper time to a frequency suitable for the steady lighting state.

In the embodiment described above, the connection between the resonance driving transformer (Td) and the inverter (Ui) is turned on/off by the switch element (Kc). Alternatively, if the operating frequency of the inverter (Ui) in the steady lighting state is low, and if, depending on the capacitance of the capacitor (Cd), while the connection between the resonance driving transformer (Td) and the inverter (Ui) is maintained if there is no problem in the operation in the steady lighting state, the switch element (Kc) may be removed.

In the case in which the serial trigger type lamp is used as in the present embodiment, unlike the external trigger lamp described above, the current flows through the secondary winding (St') of the starter circuit (Ut') even in the steady lighting state. Therefore, it is desirable to set the inductance of the secondary winding (St') to as low a value as possible. A capacitor (Cpt) connected between output nodes (T31 and T32) of the inverter (Ui) is provided so as to prevent a high voltage such as a surge voltage from being applied to the switch elements (Q1, Q2, Q3, and Q4) of the inverter (Ui) when the resonant transformer (Th) or the starter circuit (Ut') operates, and thus preventing the switch elements (Q1, Q2, Q3, and Q4) from being damaged by the high voltage.

Figure 13:
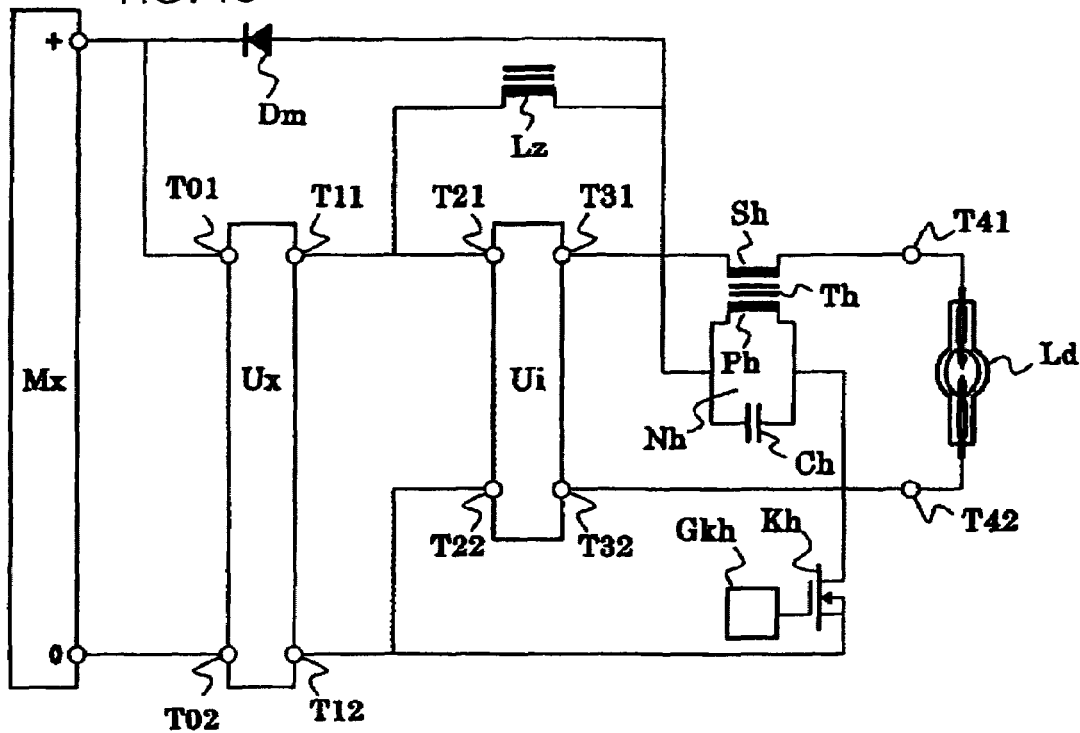
FIG. 13 is a schematic diagram showing a discharge lamp lighting apparatus according to an embodiment of the present invention.

FIG. 13 shows a schematic diagram of a discharge lamp lighting apparatus using a combination of techniques described above with reference to FIGS. 3 and 5, according to an embodiment.

In this discharge lamp lighting apparatus shown in FIG. 13, a power supply circuit (Ux) is used as a resonance driving power source to apply a voltage to a parallel resonant circuit (Nh) via a coil (Lz) serving as resonance driving current limiting means. Magnetic energy stored in the coil (Lz) when a resonance driving switch element (Kh) is in the on-state is regeneratively returned, when the resonance driving switch element (Kh) is turned off, in the form of a current flowing through a regenerative diode (Dz) to an output node (T01) of a DC power source (Mx) connected to the input side of the power supply circuit (Ux).

Each circuit configuration described above includes only circuit elements necessary to explain the operation and the functions of the discharge lamp lighting apparatus according to the embodiments, and each circuit configuration may include additional circuit elements.

The present invention is not limited to the details of the embodiments described above in terms of the circuit configuration, the operating conditions, etc. In the actual design of the discharge lamp lighting apparatus, various modifications in terms of the circuit configuration and/or the operating conditions are allowed. More specifically, the circuit parameters, the polarity of signals, etc. may be selected properly, additional circuit elements may be provided, and some circuit elements may be removed.

For example, the circuit configurations according to the respective embodiments described above may further include a mechanism for protecting circuit elements such as switch elements realized by FETs or the like from being damaged by an overvoltage, an overcurrent, or overheat, and/or a mechanism for suppressing radiation noise or conductive noise generated during the operation of circuit elements of the power supply apparatus or preventing such noise from being output to the outside. More specifically, for example, a snubber circuit, a varistor, a clamp diode, a current limiter (such as a pulse-by-pulse current limiter), a common mode or normal mode noise filter choke coil, a noise filter capacitor, etc. may be added as required to the circuit configurations according to the embodiments described above. In the present invention, the circuit configuration of the discharge lamp lighting apparatus is not limited to those described above, but other circuit configurations may be used.

The preceding description has been presented only to illustrate and describe exemplary embodiments of the discharge lamp lighting apparatus of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for lighting a discharge lamp including a pair of main-discharge electrodes disposed so as to face each other, the discharge lamp lighting apparatus comprising:

a power supply circuit for supplying electrical power to the discharge lamp;

an inverter disposed at a stage following the power supply circuit and serving to invert the polarity of a voltage applied to the discharge lamp;

a resonant transformer having a primary winding and a secondary winding, a resonant capacitor, and a periodic voltage applying section, wherein the secondary winding of the resonant transformer is disposed in a path connecting an output of the inverter to the main-discharge electrodes of the discharge lamp, the resonant capacitor being connected in parallel to the primary winding of the resonant transformer so as to form a parallel resonant circuit, the periodic voltage applying section being connected to the parallel resonant circuit, and the periodic voltage applying section being operated in a starting period of the discharge lamp at a frequency capable of causing resonance in the parallel resonant circuit.

2. The discharge lamp lighting apparatus according to claim 1, wherein the periodic voltage applying section includes a resonance driving power source, a resonance driving current limiting section, and a resonance driving switch element, which are connected in series, and wherein the periodic voltage applying section applies a voltage to the parallel resonant circuit when the resonance driving switch element is in an on-state.

3. The discharge lamp lighting apparatus according to claim 1, wherein the periodic voltage applying section includes a resonance driving power source, a resonance driving current limiting section, a resonance driving transformer having a primary winding and a secondary winding, and a transformer driving switch element, and wherein the resonance driving power source, the primary winding, and the transformer driving switch element are connected to each other, and a voltage is applied to the parallel resonant circuit via the secondary winding by a periodic operation of the transformer driving switch element.

4. The discharge lamp lighting apparatus according to claim 2, wherein the resonance driving current limiting section includes an inductive element, and a regenerative diode is connected in a particular direction to the resonance driving current limiting section so that magnetic energy corresponding to a current flowing through the inductive element during a period in which no current is supplied from the resonance driving current limiting section to the parallel resonant circuit is regeneratively returned to the resonance driving power source through the regenerative diode.

5. The discharge lamp lighting apparatus according to claim 2, wherein the resonance driving current limiting section is a primary winding of a current limiting/returning transformer having a secondary winding in addition to the primary winding, and a regenerative diode is connected, in series and in a particular direction, to the secondary winding so that magnetic energy corresponding to a current flowing through the primary winding during a period in which no current is supplied from the primary winding to the parallel resonant circuit is regeneratively returned to the resonance driving power source through the regenerative diode.

6. The discharge lamp lighting apparatus according to claim 1, wherein the periodic voltage applying section includes a resonance driving power source, a resonance driving energy supplying transformer having a primary winding and a secondary winding, a transformer driving switch element, and a regenerative diode, the resonance driving power source, the primary winding, and the transformer driving switch element are connected in series, and the resonance driving power source, the parallel resonant circuit, the secondary winding, and the regenerative diode are connected in series, whereby when the transformer driving switch element is in an on-state, magnetic energy is stored in the resonance driving energy supplying transformer, while when the transformer driving switch element is in an off-state, the magnetic energy stored in the resonance driving energy supplying transformer is regeneratively returned to the resonance driving power source via the regenerative diode and a voltage is applied to the parallel resonant circuit.

7. The discharge lamp lighting apparatus according to claim 4, wherein the resonance driving power source includes a current supply diode connected to a DC power source so as to receive a current from the DC power source, and a smoothing capacitor, and wherein a charged voltage of the smoothing capacitor is boosted up by energy regeneratively returned from the periodic voltage applying section.

8. The discharge lamp lighting apparatus according to claim 1, wherein an amplitude clamp preventing diode is connected between the parallel resonant circuit and the periodic voltage applying section in a direction in which a current flows through the amplitude clamp preventing diode only in a period in which a voltage waveform of the parallel resonant circuit has voltage values that are not greater than the voltage applying capacity of the periodic voltage applying section.

9. The discharge lamp lighting apparatus according to claim 3, wherein the inverter includes a switch element that also functions as the transformer driving switch element.

10. The discharge lamp lighting apparatus according to claim 1, wherein a resonant frequency of the parallel resonant circuit is equal to a second or higher-order harmonic frequency of the operating frequency of the periodic voltage applying section.

11. The discharge lamp lighting apparatus according to claim 1, wherein the total inductance of inductive components present in a path of a main-discharge current of the discharge lamp in a section following the inverter is equal to or lower than 170 µH.

12. The discharge lamp lighting apparatus according to claim 1, wherein the discharge lamp includes an auxiliary electrode disposed so as not to be in contact with the discharge space, in addition to the main-discharge electrodes, the discharge lamp lighting apparatus further includes a starter circuit for applying a high voltage to the auxiliary electrode, and the main-discharge current flowing between the electrodes does not substantially flow through the starter circuit.

13. The discharge lamp lighting apparatus according to claim 1, further comprising a tuning degree detection section that detects an operating status of the parallel resonant circuit and generates a tuning degree signal corresponding to a difference between the operating frequency of the periodic voltage applying section and the resonant frequency of the parallel resonant circuit, and operating frequency data maintaining/changing section that initializes or maintains operating frequency data specifying the operating frequency of the periodic voltage applying section and that increases or decreases the operating frequency data in accordance with the tuning degree signal, wherein the operating frequency data maintaining/changing section operates such that the operating frequency data maintaining/changing section initializes the operating frequency data at the beginning of an initial sequence of the discharge lamp lighting apparatus, increases or decreases the operating frequency data in a period in which no discharge occurs in the discharge lamp, and maintains the operating frequency data in a period in which discharge occurs in the discharge lamp.

14. The discharge lamp lighting apparatus according to claim 13, wherein the tuning degree detection generates the tuning degree signal on the basis of a value corresponding to the amplitude of the voltage of the parallel resonant circuit.

* * * * *